United States Patent
Isshiki et al.

(10) Patent No.: US 11,267,750 B2
(45) Date of Patent: Mar. 8, 2022

(54) TRANSLUCENT STRUCTURE

(71) Applicant: AGC INC., Chiyoda-ku (JP)

(72) Inventors: Masanobu Isshiki, Tokyo (JP); Toru Ikeda, Tokyo (JP); Takaaki Murakami, Tokyo (JP); Yosuke Takeda, Tokyo (JP); Minoru Tamada, Tokyo (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 16/279,036

(22) Filed: Feb. 19, 2019

(65) Prior Publication Data
US 2019/0256410 A1    Aug. 22, 2019

(30) Foreign Application Priority Data
Feb. 22, 2018 (JP) .............................. JP2018-030054

(51) Int. Cl.
*G02B 1/14* (2015.01)
*C03C 17/00* (2006.01)
(Continued)

(52) U.S. Cl.
CPC ............ *C03C 17/007* (2013.01); *C03C 15/00* (2013.01); *G02B 1/14* (2015.01); *G02B 1/18* (2015.01);
(Continued)

(58) Field of Classification Search
CPC .......... B32B 17/00; B32B 17/06–1099; C03C 2204/08; C03C 15/00; C03C 17/28;
(Continued)

(56) References Cited

U.S. PATENT DOCUMENTS 5,618,448 A * 4/1997 Kuroe ................... C03C 15/00
216/97
2005/0008822 A1* 1/2005 Miyamoto ........... G11B 5/7257
428/141
(Continued)

FOREIGN PATENT DOCUMENTS

CN       101004460        7/2007
JP       2007-187952 A    7/2007
(Continued)

OTHER PUBLICATIONS

Machine translation of JP 2013/061636 A, obtained from J-PlatPat service of the JPO. (Year: 2021).*

*Primary Examiner* — Z. Jim Yang
(74) *Attorney, Agent, or Firm* — Oblon, McClelland, Maier & Neustadt, L.L.P.

(57) ABSTRACT

The present invention relates to a translucent structure having a surface unevenness shape which has: an area ratio of surface flat regions in which an angle formed with a flat surface is in a range of 0° to 0.5° of in a range of 0% to 5.8%; a projection density of in a range of $0.0001/\mu m^2$ to $0.05/\mu m^2$; a projection area ratio of in a range of 5.5% to 50%; a skewness Ssk which represents the degree of non-symmetry of in a range of −0.5 to 1.1; a load area factor Smr1 at a boundary between a projected mountain portion and a core portion of in a range of 0% to 14.5%; and an arithmetic average surface roughness Sa of in a range of 0.06 μm to 0.143 μm.

13 Claims, 8 Drawing Sheets

(51) Int. Cl.
*C03C 15/00* (2006.01)
*G02B 5/02* (2006.01)
*G02B 1/18* (2015.01)

(52) U.S. Cl.
CPC ........ *G02B 5/0221* (2013.01); *C03C 2204/08* (2013.01); *C03C 2217/478* (2013.01); *C03C 2217/75* (2013.01); *C03C 2217/76* (2013.01); *C03C 2218/115* (2013.01); *Y10T 428/24355* (2015.01)

(58) Field of Classification Search
CPC .......... C03C 17/32–328; G02B 5/0221; G02B 5/0226; G02B 5/0294; G02B 1/11; G02B 1/12; G02B 1/111; G02B 1/113; G02B 1/115; G02B 1/14; Y10T 428/24355; Y10T 428/24364; Y10T 428/24372; Y10T 428/24405; Y10T 428/24421
See application file for complete search history.

(56) References Cited

U.S. PATENT DOCUMENTS

| | | | |
|---|---|---|---|
| 2007/0139783 A1 | 6/2007 | Furuya et al. | |
| 2010/0246016 A1* | 9/2010 | Carlson | C09G 1/00 359/599 |
| 2011/0062849 A1* | 3/2011 | Carlson | C03C 15/00 313/110 |
| 2011/0206903 A1* | 8/2011 | Mazumder | C03C 17/28 428/161 |
| 2012/0288676 A1* | 11/2012 | Sondergard | C03C 21/005 428/141 |
| 2013/0182328 A1* | 7/2013 | Stewart | G02B 1/18 359/580 |
| 2013/0186139 A1* | 7/2013 | Tanii | C03C 23/00 65/30.12 |
| 2013/0323468 A1* | 12/2013 | Myers | C03C 17/006 428/143 |
| 2014/0246084 A1* | 9/2014 | Okahata | H01L 31/02168 136/256 |
| 2015/0174625 A1* | 6/2015 | Hart | G06F 3/041 428/141 |
| 2015/0260882 A1* | 9/2015 | Furui | G02B 5/0221 345/173 |
| 2015/0277023 A1* | 10/2015 | Etienne | G02B 5/0221 362/613 |
| 2015/0331149 A1* | 11/2015 | Bookbinder | G02B 5/0221 359/601 |
| 2016/0236974 A1* | 8/2016 | Sinapi | C03C 15/00 |
| 2016/0251259 A1* | 9/2016 | Bazemore | C03C 15/00 428/156 |
| 2016/0280584 A1* | 9/2016 | Sinapi | C03C 3/087 |
| 2017/0254930 A1* | 9/2017 | Hart | B32B 7/027 |
| 2017/0285227 A1* | 10/2017 | Chen | G02B 1/12 |
| 2018/0099307 A1* | 4/2018 | Takeda | G02B 5/0294 |
| 2018/0099904 A1* | 4/2018 | Park | C03C 21/002 |
| 2018/0134614 A1* | 5/2018 | Hall | C03B 23/0357 |
| 2018/0162091 A1* | 6/2018 | Takeda | B32B 3/30 |
| 2018/0215656 A1* | 8/2018 | Tavares Cortes | C03C 23/0075 |
| 2018/0215657 A1* | 8/2018 | Jin | C03C 15/00 |
| 2018/0239066 A1* | 8/2018 | Tachibana | G02B 5/0226 |
| 2018/0251398 A1* | 9/2018 | Ikegami | G02B 5/0294 |
| 2018/0282201 A1* | 10/2018 | Hancock, Jr. | C03C 3/083 |
| 2019/0107751 A1* | 4/2019 | Bazemore | G02B 5/0294 |
| 2020/0017400 A1* | 1/2020 | Chen | B32B 3/30 |
| 2021/0188698 A1* | 6/2021 | Hu | C03C 3/097 |

FOREIGN PATENT DOCUMENTS

| | | | | |
|---|---|---|---|---|
| JP | 2009-5864 C | | 3/2009 | |
| JP | 2013-61636 A | | 4/2013 | |
| JP | 2014206728 A | * | 10/2014 | ............ F21V 3/049 |
| JP | 2016-153914 A | | 8/2016 | |
| WO | WO 2015/137196 A1 | | 9/2015 | |
| WO | WO-2015137196 A1 | * | 9/2015 | .......... G02B 5/0294 |
| WO | WO-2016069113 A1 | * | 5/2016 | ............. G02B 1/12 |
| WO | WO-2018152021 A1 | * | 8/2018 | ............ C03C 21/002 |
| WO | WO-2019055745 A1 | * | 3/2019 | ............ C03C 21/002 |

* cited by examiner

TRANSLUCENT STRUCTURE

FIELD OF THE INVENTION

The present invention relates to a translucent structure capable of attaining high antiglare performance and high visibility at the same time.

BACKGROUND OF THE INVENTION

In image display devices (liquid crystal displays, organic EL displays, plasma displays, etc.) provided in various devices (e.g., TV receivers, personal computers, smartphones, and cellphones), vehicles, etc., the visibility is lowered by a reflection image of external light such as indoor illumination light (from, for example, fluorescent lamps) or sunlight shining on the display screen.

To suppress reflection of external light, the surface of a substrate (e.g., glass plate) as the display surface of an image display device is subjected to antiglare treatment. Antiglare treatment is treatment for making the surface uneven, thereby scattering incident light. Because of diffuse reflection of incident light, a reflection image is blurred and hence the reflection of external light is made less influential. Among known antiglare treatment methods are etching the surface of a substrate and forming an antiglare layer having an uneven surface. One known antiglare layer forming method is a method that a coating liquid containing a silica precursor such as a hydrolytic condensate of alkoxysilane is applied to a substrate by spraying and then baked (refer to Patent document 1, for example).

However, in the case where antiglare treatment is performed on the surface of a substrate, a problem arises that the visibility of an image lowers because of increase of the haze value, increase in sparkle, etc.

As one of surface shape parameters for obtaining high resolution, there is a method of showing that an area of flat portions is small in a condition of (H1-H2)/Ra≥0.25, in which H1 is a height at the area ratio of 70% and H2 is a height at the area ratio of 99% in a bearing curve of rough curved surface of uneven surface. This condition shows that an area of flat portions lying at valley bottom of the unevenness is small, but does not give any definition for flat portions lying at high portions in the height direction. However, the specular reflection occurs also on the flat portions lying at the high portions in the height direction. Therefore, the above-described definition is not sufficient for evaluating the flat portion ratio by obtaining gradient for all portions (refer to Patent document 2, for example).
Patent document 1: JP-A-2009-058640
Patent document 2: WO 2015/137196

SUMMARY OF THE INVENTION

An object of the present invention is to provide a translucent structure capable of attaining high antiglare performance and high visibility at the same time.

In order to achieve the above-described object, the present invention provides a translucent structure having a surface unevenness shape which has: an area ratio of surface flat regions in which an angle formed with a flat surface is in a range of 0° to 0.5° of in a range of 0% to 5.8%; a projection density of in a range of 0.0001/μm² to 0.05/μm²; a projection area ratio of in a range of 5.5% to 50%; a skewness Ssk which represents the degree of non-symmetry of in a range of −0.5 to 1.1; a load area factor Smr1 at a boundary between a projected mountain portion and a core portion of in a range of 0% to 14.5%; and an arithmetic average surface roughness Sa of in a range of 0.06 μm to 0.143 μm.

The present invention provides a translucent structure having a surface unevenness shape which has: an area ratio of surface flat regions in which an angle formed with a flat surface is in a range of 0° to 0.5° of in a range of 0.115% to 0.46%; a projection density of in a range of 0.0048/μm² to 0.05/μm²; a projection area ratio of in a range of 12% to 50%; a skewness Ssk which represents the degree of non-symmetry of in a range of −0.5 to 1.1; a load area factor Smr1 at a boundary between a projected mountain portion and a core portion of in a range of 7.9% to 14.5%; and an arithmetic average surface roughness Sa of in a range of 0.06 μm to 0.143 μm.

The present invention provides a translucent structure having a surface unevenness shape which has: an area ratio of surface flat regions in which an angle formed with a flat surface is in a range of 0° to 0.5° of in a range of 0% to 0.32%; a projection density of in a range of 0.0001/μm² to 0.05/μm²; a projection area ratio of in a range of 5.5% to 50%; a skewness Ssk which represents the degree of non-symmetry of in a range of −0.5 to 1.10; a load area factor Smr1 at a boundary between a projected mountain portion and a core portion of in a range of 0% to 14.5%; and an arithmetic average surface roughness Sa of in a range of 0.075 μm to 0.143 μm.

The present invention provides a translucent structure having a surface unevenness shape which has: an area ratio of surface flat regions in which an angle formed with a flat surface is in a range of 0° to 0.5° of in a range of 0.115% to 0.32%; a projection density of in a range of 0.0048/μm² to 0.05/μm²; a projection area ratio of in a range of 12% to 50%; a skewness Ssk which represents the degree of non-symmetry of in a range of −0.5 to 1.1; a load area factor Smr1 at a boundary between a projected mountain portion and a core portion of in a range of 7.9% to 14.5%; and an arithmetic average surface roughness Sa of in a range of 0.075 μm to 0.143 μm.

The present invention provides a translucent structure having a surface unevenness shape which has: an area ratio of surface flat regions in which an angle formed with a flat surface is in a range of 0° to 0.5° of in a range of 0.1% to 0.4%; a projection density of in a range of 0.0001/μm² to 0.05/μm²; a projection area ratio of in a range of 5.5% to 50%; a skewness Ssk which represents the degree of non-symmetry of in a range of −0.5 to 1.1; a load area factor Smr1 at a boundary between a projected mountain portion and a core portion of in a range of 0% to 14.5%; and an arithmetic average surface roughness Sa of in a range of 0.06 μm to 0.1 μm.

The present invention provides a translucent structure having a surface unevenness shape which has: an area ratio of surface flat regions in which an angle formed with a flat surface is in a range of 0° to 0.5° of in a range of 0.115% to 0.4%; a projection density of in a range of 0.0048/μm² to 0.05/μm²; a projection area ratio of in a range of 12% to 50%; a skewness Ssk which represents the degree of non-symmetry of in a range of −0.5 to 1.1; a load area factor Smr1 at a boundary between a projected mountain portion and a core portion of in a range of 7.9% to 14.5%; and an arithmetic average surface roughness Sa of in a range of 0.06 μm to 0.1 μm.

The present invention provides a translucent structure having a surface unevenness shape which has: an area ratio of surface flat regions in which an angle formed with a flat surface is in a range of 0° to 0.5° of in a range of 0.1% to 0.4%; a projection density of in a range of 0.0040/μm² to 0.016/μm²; a projection area ratio of in a range of 20% to 34%; a skewness Ssk which represents the degree of non-symmetry of in a range of 0.14 to 0.45; a load area factor Smr1 at a boundary between a projected mountain portion and a core portion of in a range of 7.8% to 10.17%; and an arithmetic average surface roughness Sa of in a range of 0.06 μm to 0.1 μm.

It is preferable that the translucent structure according to the present invention is a glass plate.

It is preferable that the translucent structure according to the present invention is a glass whose surface has been subjected to unevenness forming treatment or a glass having formed thereon a coating having unevenness shapes.

It is preferable that the translucent structure according to the present invention is a strengthened glass plate.

It is preferable that the translucent structure according to the present invention has three-dimensional shapes.

The translucent structure according to the present invention may have a print layer.

The translucent structure according to the present invention may have a water-repelling/oil-repelling treated layer formed thereon.

The present invention provides a display device including the translucent structure according to the present invention as a cover member.

Among important optical properties that are required for an antiglare film are high antiglare performance, high visibility, and low sparkle. However, in general, visibility lowers and sparkle becomes more conspicuous as antiglare performance is improved. It is therefore difficult to satisfy both of high antiglare performance and high visibility and, furthermore, all of high antiglare performance, high visibility, and low sparkle.

The translucent structure according to the present invention makes it possible to attain high antiglare performance and high visibility and, preferably, even low sparkle at the same time.

DETAILED DESCRIPTION OF THE INVENTION

Figure 1A:
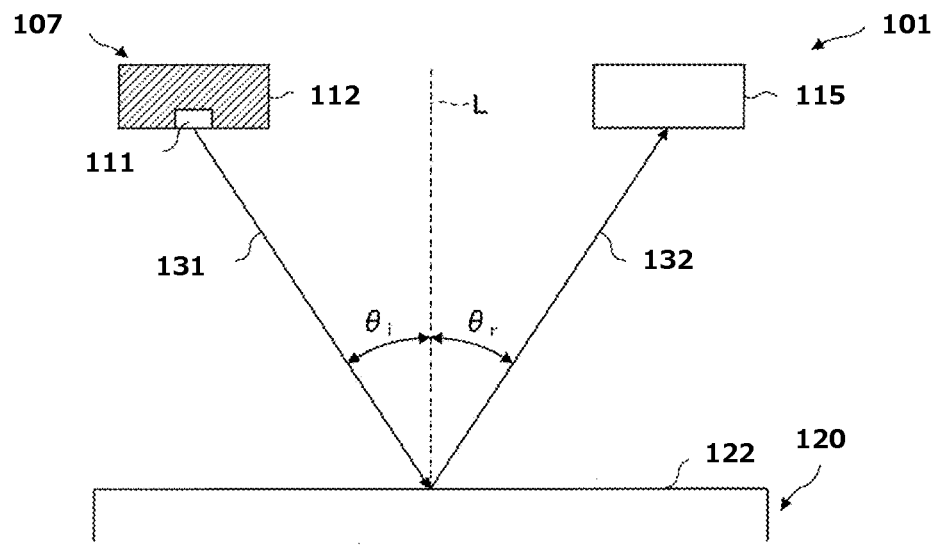
FIG. 1A illustrates a procedure for measuring a reflection image diffusiveness index value R.

A translucent structure according to the present invention will be hereinafter described.

In this specification, the term "translucent" means that a structure concerned allows passage of visible light. Thus, it suffices that the translucent structure according to the present invention allows passage of visible light and it is preferable that it be transparent. A translucent structure being transparent means that it allows passage of 80% or more of light in a wavelength range of 400 nm to 1,100 nm on average (i.e., the average transmittance is 80% or higher). An average transmittance of light in the wavelength range of 400 nm to 1,100 nm is measured using an integrating sphere.

Examples of materials of the translucent structure according to the present invention include glass and resins. Examples of glass include soda lime glass, borosilicate glass, aluminosilicate glass, and alkali-free glass. Examples of resins include polyethylene terephthalate, polycarbonate, triacetyl cellulose, and polymethyl methacrylate.

The translucent structure according to the present invention may be in the form of a plate, a film, or the like.

It is preferable that the translucent structure according to the present invention is a glass plate. The glass plate may be a smooth glass plate formed by a float process, a fusion process, a down-drawing process, or the like or a figured glass plate formed by a roll-out process, or the like and having an uneven surface. The glass plate need not always be a flat glass plate and may be a curved glass plate.

It is preferable that the glass plate is a strengthened glass plate that underwent air cooling strengthening or chemical strengthening. Strengthening treatment increases the strength of glass and can, for example, reduce the thickness while maintaining the strength.

There are no particular limitations on the thickness of the translucent structure according to the present invention. It is possible to use a glass plate whose thickness is 10 mm or less, preferably 0.05 mm to 3 mm. A thinner glass plate is preferable for uses in which increase in transmittance is desired because light absorption can be suppressed more as the thickness decreases. Furthermore, the weight of the translucent structure is reduced as its thickness decreases.

An embodiment of the present invention will be hereinafter described in detail.

This specification employs, as an index of antiglareness, a reflection image diffusiveness index value R.

(Reflection Image Diffusiveness Index Value R)

A reflection image diffusiveness index value R employed in this specification is measured after the main surface that is not formed with an antiglare layer is painted out sufficiently in black using a paint marker PX-30 (manufactured by Mitsubishi Pencil Co., Ltd.) to prevent reflection at the interface between the main surface not formed with the antiglare layer and the air. The reflection image diffusiveness index value R represents to what extent a reflection image of an object (e.g., illumination device) disposed near a glass plate coincides with the object. It has been confirmed that the reflection image diffusiveness index value R is in good correlation with an antiglareness judgment result of visual recognition of an observer. For example, a glass plate exhibiting a small reflection image diffusiveness index value R (close to "0") is low in antiglareness and, conversely, a glass plate exhibiting a large reflection image diffusiveness index value R (close to "1") is high in antiglareness.

In general, in the case where reflection at the interface between the main surface not formed with an antiglare layer and the air is prevented, the value R becomes larger than in the case where reflection at the interface between the main surface not formed with the antiglare layer and the air is not prevented because the quantity of light that returns to the incidence side by specular reflection decreases accordingly. In the present invention, in order to evaluate the optical characteristics of an uneven surface more correctly, a measurement is performed in a state that the reflection at the interface between the main surface not formed with the antiglare layer and the air is prevented.

A method for measuring a reflection image diffusiveness index value R will be described below with reference to FIGS. 1A and 1B.

FIG. 1A schematically illustrates one example of a measuring instrument that is used for measuring a reflection image diffusiveness index value R of an antiglare film-attached transparent substrate.

As shown in FIG. 1A, the measuring instrument 101 has a linear light source device 107 and a surface brightness measuring device 115.

The linear light source device 107 has a light source 111 and a black flat plate 112 disposed around the light source 111. The light source 111 is a linear light source extending in a direction perpendicular to the paper surface in FIG. 1A, and is disposed in a slit-shaped opening provided at the center of the black flat plate 112.

The surface brightness measuring device 115 is disposed in a plane that is perpendicular to the longitudinal axis of the light source 111 and that passes through almost the center of the light source 111. Accordingly, the surface brightness measuring device 115 is disposed so as to face the light source 111 at a position almost the center of the light source 111 along the longitudinal axis. The distance between the surface brightness measuring device 115 and the light source 111 is about 60 mm.

The focal point of the surface brightness measuring device 115 is set at a position where an image of the linear light source device 107 is formed after being reflected by the outer surface 122 of the antiglare film-attached transparent substrate 120.

The antiglare film-attached transparent substrate 120, which is an object to be measured, is disposed in the measuring instrument 101 in such a manner that the outer surface 122 with an antiglare film is located on the side of the linear light source device 107 and the surface brightness measuring device 115. In cases of the antiglare film-attached transparent substrate relating to Examples A1 to F2 and Comparative Examples A1 to D7, the outer surface 122 is an antiglare film-attached outer surface. A surface opposite to the antiglare film-attached outer surface is painted out sufficiently in black using a paint marker PX-30 (manufactured by Mitsubishi Pencil Co., Ltd.) to prevent reflection at the interface between the back surface of the antiglare film-attached transparent substrate and the air during the measurement.

When measuring a reflection image diffusiveness index value R of the antiglare film-attached transparent substrate 120 using the measuring instrument 101, a light is irradiated from the light source 111 of the linear light source device 107 toward the outer surface 122 of the antiglare film-attached transparent substrate 120.

The light irradiated from the linear light source device 107 enters into the outer surface 122 of the antiglare film-attached transparent substrate 120 with an incident angle $\theta i$. This light is reflected and/or scattered on the outer surface 122 of the antiglare film-attached transparent substrate 120 with an reflection angle $\theta r$, and then enters into the surface brightness measuring device 115.

For example, FIG. 1A shows a situation in which a first incident light 131 irradiated from the linear light source device 107 is reflected (specular reflection) on the outer surface 122 to produce a first reflection light 132, and then enters into the surface brightness measuring device 115.

In this case, a formula $\theta r - \theta i = 0°$ is formed between the incident angle $\theta i$ of the first incident light 131 and the reflection angle $\theta r$ of the first reflection light 132.

In such a case of the specular reflection, especially, in the case of the incident angle $\theta i$=the reflection angle $\theta r$=5.7°, a brightness of the first reflection light 132 measured by the surface brightness measuring device 115 is denoted as $R_1$. However, since an actual measurement involves errors, the brightness $R_1$ is a brightness of the first reflection light 132 measured under the condition of $\theta r - \theta i = 5.7° \pm 0.1°$.

Figure 1B:
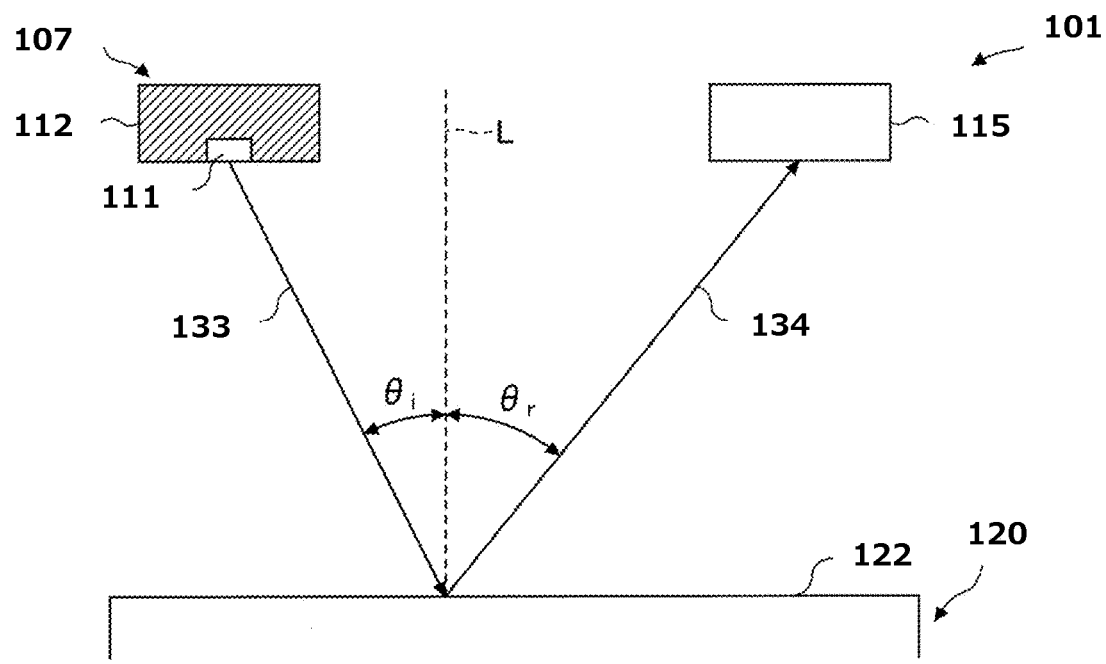
FIG. 1B illustrates a procedure for measuring a reflection image diffusiveness index value R.

On the other hand, FIG. 1B shows a situation in which a second incident light 133 irradiated from the linear light source device 107 is scattered and reflected on the outer surface 122 to produce a second reflection light 134, and then enters into the surface brightness measuring device 115.

Here, especially in the case where a formula $\theta r - \theta i = 0.5° \pm 0.1°$ is formed between the incident angle $\theta i$ of the second incident light 133 and the reflection angle $\theta r$ of the second reflection light 134, a brightness of the second reflection light 134 measured by the surface brightness measuring device 115 is denoted as $R_2$.

Additionally, in the case where a formula $\theta r - \theta i = -0.5° \pm 0.1°$ is formed between the incident angle $\theta i$ of the second incident light 133 and the reflection angle $\theta r$ of the second reflection light 134, a brightness of the second reflection light 134 measured by the surface brightness measuring device 115 is denoted as $R_3$.

A reflection image diffusiveness index value R of the antiglare film-attached transparent substrate 120 is calculated according to the following Equation (1) using the thus-acquired brightness values $R_1$, $R_2$, and $R_3$:

$$\text{(Reflection image diffusiveness index value } R) = (R_2 + R_3)/(2 \times R_1)) \tag{1}$$

It has been confirmed that such a reflection image diffusiveness index value R is in good correlation with an antiglareness judgment result of visual recognition of an observer. For example, an antiglare film-attached transparent substrate 120 that exhibits a small reflection image diffusiveness index value R (close to "0") is low in antiglareness and, conversely, an antiglare film-attached transparent substrate 120 that exhibits a large reflection image diffusiveness index value R (close to "1") is high in antiglareness.

A measurement as described above can be carried out using, for example, an instrument SMS-1000 manufactured by DM & S. In the case where this instrument is used, a C1614A lens having a camera lens focal length 16 mm is used with an aperture 5.6. The distance from the outer surface 122 to the camera lens is set at about 300 mm and the imaging scale is set in a range of 0.0276 to 0.0278.

Additionally, in this measuring instrument, the dimension of the slit-shaped opening of the black flat plate 112 in the linear light source device 107 is 101 m×1 mm.

In this specification, a visibility index value (clarity) T that is measured according to the following procedure is employed as an index of visibility.
(Visibility Index Value T)

A visibility index value T is measured according to the following procedure using a gonio-photometer GC5000L manufactured by Nippon Denshoku Industries Co., Ltd. First, first light is irradiated on the translucent structure from the side opposite to the main surface that underwent antiglare treatment in a direction that is in a range of 0°±0.5° (0° corresponds to a direction parallel to the thickness direction of the translucent structure; hereinafter also referred to as an "angle 0° direction"). The first light passed through the translucent structure, and transmission light that exited from the main surface that underwent antiglare treatment is received and its luminance is measured as "luminance of 0° transmission light" by the instrument.

Similar manipulations are then performed while the angle θ at which light that exited from the main surface that underwent antiglare treatment is received is varied in a range of −30° to 30°. A luminance distribution of light beams that exited from the main surface formed with an antiglare film is measured and the measured luminance values are summed up to obtain "luminance of entire transmission light."

A visibility index value (clarity) T is calculated according to the following Equation (2):

(Visibility index value (clarity)$T$)=(luminance of 0° transmission light)/(luminance of entire transmission light) (2).

It has been confirmed that the visibility index value (clarity) T is in good correlation with a resolution judgment result of visual recognition of an observer and exhibits a behavior that is close to one as recognized by the human visual sense. For example, a translucent structure having an antiglare film that exhibits a small visibility index value T (close to "0") is low in resolution and, conversely, a translucent structure that exhibits a large visibility index value T is high in resolution. As such, the visibility index value T can be used as a quantitative index to be used for judging resolution of a translucent structure.

It is preferable that the visibility index value T of a translucent structure is larger than or equal to 0.94, it is more preferable that the visibility index value T thereof is larger than or equal to 0.945, and it is particularly preferable that the visibility index value T thereof is larger than or equal to 0.96. When the visibility index value T of the translucent structure is larger than or equal to 0.94, an advantage can be obtained that, in the case of using the translucent structure as a cover glass of a display device, the visibility of a display is very high and is clear, that is, easy to see.

In this specification, a sparkle index value (anti-sparkle) Z that is measured according to the following procedure is employed as a sparkle index.

The sparkle index value (anti-sparkle) represents to what extent an unevenness of brightness is detected, the unevenness of brightness being generated when a light (image) from a displayed image transmits a glass plate, the transmitted light is scattered by the surface of the glass plate, and then the scattered lights interferes to each other. It has been confirmed that the sparkle index value (anti-sparkle) is in good correlation with a sparkle judgment result of visual recognition of an observer. For example, there is a tendency that a glass plate having a small sparkle index value Z exhibits remarkable sparkle and, conversely, a glass plate having a large sparkle index value Z is low in sparkle.
(Sparkle Index Value Z)

Figure 2:
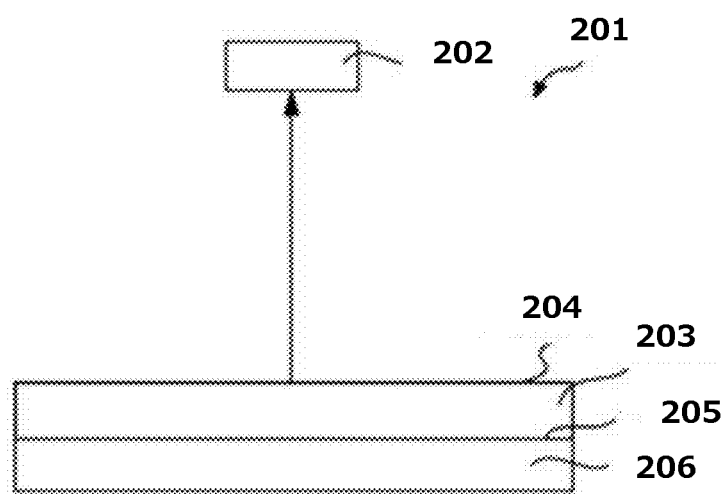
FIG. 2 illustrates a procedure for measuring a sparkle index value (anti-sparkle) Z.

Next, a method for measuring a sparkle index value (anti-sparkle) Z of the transparent substrate will be described below with reference to FIG. 2. FIG. 2 schematically illustrates one example of a measuring instrument that is used for measuring a sparkle index value (anti-sparkle) Z of the transparent substrate (a sparkle index value measuring instrument 201).

To measure a sparkle index value Z, first, a display device 206 (iPad third generation (registered trademark)) having resolution of 264 ppi is prepared. The display surface of the display device may be provided with a cover for, for example, protection from damage.

A sample to be measured, that is, an antiglare film-attached transparent substrate 203 (or a transparent substrate that underwent antiglare treatment and hence has an antiglare function), is set on the side of the display surface of the display device 206. In the case where an antiglare film is formed on one main surface (a first main surface 204) of the antiglare film-attached transparent substrate 203, the antiglare film-attached transparent substrate 203 is disposed on the side of the display surface of the display device 206 in such a manner that the first main surface 204 is located on the side opposite to the display device 206 (i.e., on the side of a detector 202). Namely, the antiglare film-attached transparent substrate 203 is disposed on the side of the display surface of the display device 206 so that the other surface (a second main surface 205) faces the display device 206.

Next, in a state that the display device 206 is turned on, the degree of sparkle of the antiglare film-attached transparent substrate 203 is detected by an image analysis using an analyzing instrument SMS-1000 manufactured by Display-Messtechnik & Systeme (DM & S). As a result, a sparkle value Za is obtained.

It is preferable that a green monochrome image constituted by RGB values (0, 255, 0) is displayed on the entire display screen of the display device 206. This is to minimize influences of a difference in the appearance of an image that depends on the display color, etc. The distance d between a solid-state imaging device and the antiglare film-attached transparent substrate 203 is set at 540 mm which corresponds to a distance index r=10.8.

Here, the distance index r is represented according to the following equation using the focal length f of the solid-state imaging device and the distance d between the solid-state imaging device and the antiglare film-attached transparent substrate 203:

(Distance index $r$)=(distance $d$ between the solid-state imaging device and the antiglare film-attached transparent substrate 203)/(focal length $f$ of the solid-state imaging device).

Subsequently, a similar measurement is performed on a reference sample which is a glass substrate (VRD140 glass manufactured by AGC Glass Europe B.V.) having the same thickness as the antiglare film-attached transparent substrate 203.

A sparkle value obtained from the reference sample is employed as a sparkle value Zs.

A sparkle index value (anti-sparkle) Z of the antiglare film-attached transparent substrate 203 is calculated on the basis of the thus-obtained values Za and Zs according to the following Equation (3):

$$(\text{Sparkle index value } Z) = 1 - (Za/Zs) \qquad (3).$$

It has been confirmed that the sparkle index value (anti-sparkle) Z is in good correlation with a sparkle judgment result of visual recognition of an observer. For example, there is a tendency that a transparent substrate having a small sparkle index value Z exhibits remarkable sparkle and, conversely, a transparent substrate having a large sparkle index value Z is low in sparkle.

In this measuring method, it is preferable to use, as a camera lens, a 23FM50SP lens having a focal length of 50 mm with an aperture 5.6.

It is preferable that the sparkle index value (anti-sparkle) Z of the translucent structure is larger than or equal to 0.845, and it is more preferable that the sparkle index value (anti-sparkle) Z thereof is larger than or equal to 0.905. When the sparkle index value Z of the translucent structure is larger than or equal to 0.845, an advantage can be obtained that the sparkle is suppressed and the visibility is thereby increased.

A translucent structure that is high in antiglareness and visibility can be represented by the above-described three index values, that is, the reflection image diffusiveness index value R, the visibility index value (clarity) T, and the sparkle index value Z. In a process of producing an ideal translucent structure, the inventors have found that the area ratio of surface flat regions plays a very important role.

It is generally known that the reflection image diffusiveness index value R can be increased by increasing the surface unevenness (e.g., increasing the arithmetic average surface roughness value Sa). However, conventionally, a problem is unavoidable that the visibility index value T decreases if the reflection image diffusiveness index value R is increased. To increase the reflection image diffusiveness index value R, it is necessary to decrease the specular reflection with respect to the diffuse reflection intensity. Since the specular reflection occurs in surface flat regions that are included in surface unevenness regions, in order to decrease the specular reflection, it is effective to decrease the area ratio of the surface flat regions. In conventional antiglare film forming methods and glass etching methods, flat regions necessarily exist in unevenness height maximum and minimum portions.

The present inventors have discovered a novel glass etching method and antiglare film forming method and implemented them as embodiments and have further found by a simulation that the reflection image diffusiveness index value R can be increased further while the visibility index value T is kept the same if the area ratio of surface flat regions can be decreased further.

(Antiglare Treatment)

In the translucent structure according to the present invention, surface unevenness shapes that satisfy the above-described conditions can be formed by so-called antiglare treatment (AG treatment). As the antiglare treatment, the following two kinds of treatments can be used.

(Antiglare Treatment A)

In antiglare treatment A, surface unevenness shapes are formed by subjecting the surface of a translucent structure to etching treatment.

A known etching method can be employed as the etching treatment according to the material of the translucent structure, unevenness shapes to be formed, and other factors. For example, in the case where the translucent structure is a glass plate, an etching method of bringing a fluorinating agent into contact with the surface of the glass plate can be employed. When the fluorinating agent is brought into contact with the surface of the glass plate, the fluorinating agent reacts with $SiO_2$ as a glass skeletal structure to generate $SiF_4$ (gas) and the remaining components turn to silicon fluorides because of loss of the skeletal structure, whereby the glass surface is rendered uneven. Examples of the fluorinating agent include simple substance fluorine ($F_2$) and hydrogen fluoride (HF). In this method, unevenness shapes formed can be adjusted according to the kind of fluorinating agent used, the time during which the fluorinating agent is kept in contact with the surface of the glass plate, the etching temperature, or the like.

In the case where etching treatment is performed using an etching liquid containing a fluorinating agent and particles (e.g., glass beads), unevenness shapes can be changed by changing the content of the particles in the fluorinating agent. For example, if the content of the particles in the treatment liquid is set large, etching with the fluorinating agent is obstructed and the etching rate is thereby lowered. As a result, projections and recesses formed by the etching treatment become smaller and the haze factor is reduced.

Among glass plate etching methods other than the method of bringing a fluorinating agent into contact with the surface of the glass plate and etching methods that can be applied to translucent structures made of a material other than glass are, for example, blast treatment and ion etching treatment.

Etching treatment may be performed two or more times under different sets of treatment conditions. This may be such that projections are formed by first etching treatment and second projections are formed by second etching treatment. In this case, it is preferable that the etching rate of the second etching treatment is higher than that of the first etching treatment.

In the case where etching treatment is performed using an etching liquid described above, the content of particles in the etching liquid may be changed between the first etching treatment and the second etching treatment. For example, if the content of particles in the etching liquid used in the second etching treatment is made smaller than in the first etching treatment, in the second etching treatment, the projections and recesses formed in the first etching treatment are made gentler.

(Antiglare Treatment B)

In antiglare treatment B, surface unevenness shapes are formed by forming a coated film by applying a paint composition on the surface of a translucent structure and baking the coated film. For example, the paint composition contains a liquid medium (b) and at least one of a silica precursor (a) and particles (c).

(Silica Precursor (a))

The silica precursor means a substance that enables formation of a matrix having silica as a main component. A known a silane compound such as alkoxysilane or a hydrolytic condensate thereof may be used as the silica precursor (a) as appropriate. Either a single kind of silica precursor or a combination of two or more kinds of silica precursors may be used.

From the viewpoint of preventing development of cracks in a coated film and film peeling, it is preferable that the silica precursor (a) contains one or both of alkoxysilane which has carbon atoms that are directly bonded to a silicon atom and a hydrolytic condensate thereof. From the viewpoint of wear resistance of a coated film, it is preferable that the silica precursor (a) contains one or both of tetraalkoxysilane and a hydrolytic condensate thereof.

(Liquid Medium (b))

The liquid medium (b) is a medium for causing the silica precursor (a) to dissolve or disperse therein, and is preferably one for causing the particles (c) to disperse therein. The liquid medium (b) may be one having both of a function of allowing the silica precursor (a) to dissolve or disperse therein and a function of allowing the particles (c) to disperse therein.

The liquid medium (b) at least contains a liquid medium (31) whose boiling temperature is lower than or equal to 150° C. It is preferable that the boiling temperature thereof is in a range of 50° C. to 145° C., and it is more preferable that the boiling temperature thereof is in a range of 55° C. to 140° C. In the case where the boiling temperature of the liquid medium (b1) is lower than or equal to 150° C., surface unevenness shapes are formed by applying a paint composition on the surface of a translucent structure using an electrostatic coating machine that is equipped with an electrostatic coating gun having a rotary atomizing head and baking it. In the case where the boiling temperature is higher than or equal to the lower limit of the above range, surface unevenness shapes can be formed effectively after droplets of the paint composition are stuck to the surface of the translucent structure.

Since water is necessary for the hydrolysis of alkoxysilane or the like in the silica precursor (a), the liquid medium (b) should contain water in the liquid medium (b1) unless liquid medium replacement is done after the hydrolysis. If necessary, the liquid medium (b) may further contain a liquid medium other than the liquid medium (b1), that is, a liquid medium whose boiling temperature is higher than 150° C.

(Particles (c))

Examples of materials of the particles (c) include a metal oxide, a metal, a pigment, and a resin. Examples of the metal oxide include $Al_2O_3$, $SiO_2$, $SnO_2$, $TiO_2$, $ZrO_2$, $ZnO$, $CeO_2$, $SnO_x$ containing Sb (ATO), $In_2O_3$ containing Sn (ITO), and $RuO_2$. In the case where a matrix of surface unevenness shapes has silica as a main component, the use of $SiO_2$ is preferable because it is equivalent in refractive index to the matrix. Examples of the metal include metal simple substances (Ag, Ru, etc.), alloys (AgPd, RuAu, etc.). Examples of the pigment include inorganic pigments (titanium black, carbon black, etc.) and organic pigments. Examples of the resin include an acrylic resin, polystyrene, and a melanin resin.

The particles (c) may be any of solid particles, hollow particles, and particles having holes such as porous particles. The term "solid" means absence of cavities inside, and the term "hollow" means presence of cavities inside. The particles (c) may either be of a single kind or consist of two or more kinds.

From the viewpoints of suppressing increase of the refractive index of a coated film and lowering its reflectance, it is preferable that the particles (c) are silica particles that are shaped like a sphere, a scale, a rod, a needle, or the like. Use of spherical silica particles is preferable for the purpose of obtaining an even smaller haze factor. Use of scaly silica particles is preferable in that surface unevenness shapes can be formed by a small amount of silica particles and development of cracks in a coated film and film peeling can be suppressed. The term "scaly" means flat-shaped.

Spherical silica particles may be solid, hollow, or porous. Either only one of these kinds of spherical silica particles or two or more of these kinds of spherical silica particles may be used. Hollow silica particles are, for example, ones each of which has an outer shell made of silica ($SiO_2$) and a cavity that occupies the inside of the outer shell.

It is preferable that the average particle diameter of spherical silica particles is in a range of 10 nm to 300 nm, it is more preferable that the average particle diameter thereof is in a range of 40 nm to 200 nm, and it is further preferable that the average particle diameter thereof is in a range of 70 nm to 110 nm. In the case where the average particle diameter thereof is larger than or equal to the lower limit of the above range, even lower sparkle can be attained. In the case where the average particle diameter thereof is smaller than or equal to the upper limit of the above range, the haze factor can be made even smaller and high dispersion stability in the paint composition can be attained.

The average particle diameter of spherical silica particles means a particle diameter at a 50% point in a cumulative volume distribution curve in which the entire volume of a volume-based particle diameter distribution is regarded as 100%, that is, a volume-based cumulative 50% diameter (D50). A particle diameter distribution is determined from a histogram and a cumulative volume distribution curve measured by a laser diffraction/scattering particle diameter measuring instrument.

Scaly silica particles are flaky silica primary particles or silica secondary particles each of which is formed by plural flaky silica primary particles that are oriented parallel with each other and laid one on another. Usually, each of silica secondary particles is in a layered particle form. Scaly silica particles may be either only silica primary particles or only silica secondary particles or may include both of silica primary particles and silica secondary particles.

It is preferable that the thickness of flaky silica primary particles is in a range of 0.001 μm to 0.1 μm. In the case where the thickness thereof is within this range, a scaly silica secondary particle can be formed by plural flaky silica primary particles that are oriented parallel with each other and laid one on another. It is preferable that the ratio of the minimum length to the thickness of silica primary particles is larger than or equal to 2, it is more preferable that the ratio thereof is larger than or equal to 5, and it is further preferable that the ratio thereof is larger than or equal to 10.

It is preferable that the thickness of scaly silica secondary particles is in a range of 0.001 μm to 3 μm, and it is more preferable that the thickness thereof is in a range of 0.005 μm to 2 μm. It is preferable that the ratio of the minimum length to the thickness of silica secondary particles is larger than or equal to 2, it is more preferable that the ratio thereof is larger than or equal to 5, and it is further preferable that the ratio thereof is larger than or equal to 10. It is preferable that silica secondary particles exist independently of each other without being fused with each other.

It is preferable that the average aspect ratio of scaly silica particles is in a range of 30 to 200, it is more preferable that the average aspect ratio thereof is in a range of 40 to 160, and it is further preferable that the average aspect ratio thereof is in a range of 50 to 120. In the case where the average aspect ratio is larger than or equal to the lower limit of the above range, development of cracks in surface unevenness shapes and film peeling can be suppressed satisfactorily even if the film thickness is large. In the case where the average aspect ratio is smaller than or equal to the upper limit of the above range, high dispersion stability in the paint composition can be attained.

The aspect ratio means the ratio of the greatest length to the thickness of a particle, and the average aspect ratio means an average value of aspect ratios of 50 particles selected randomly. A thickness and a greatest length of each particle are measured by an atomic force microscope (AFM) and a transmission electron microscope (TEM), respectively.

It is preferable that the average particle diameter of scaly silica particles is in a range of 50 nm to 500 nm, and it is more preferable that the average particle diameter thereof is in a range of 100 nm to 300 nm. In the case where the average particle diameter thereof is larger than or equal to the lower limit of the above range, even lower sparkle can be attained. Furthermore, development of cracks in surface unevenness shapes and film peeling can be suppressed satisfactorily even if the film thickness is large. In the case where the average particle diameter thereof is smaller than or equal to the upper limit of the above range, the haze factor can be made even smaller. Furthermore, high dispersion stability in the paint composition can be attained.

An average particle diameter of scaly silica particles is measured in the same manner as that of spherical silica particles.

There may occur a case that a powder or a dispersion contains not only scaly silica particles but also irregularly-shaped silica particles that are produced during manufacture of scaly silica particles. For example, scaly silica particles are produced by disintegrating and dispersing aggregate-shaped silica tertiary particles (hereinafter also referred to as "silica aggregates") that are formed in such a manner that scaly silica particles are aggregated and are laid on each other irregularly so as to have interstices. Irregularly-shaped silica particles are reduced in particle size from silica aggregates to some extent but not to such an extent that individual scaly silica particles are obtained; lumps are formed by plural scaly silica particles. In the case where irregularly-shaped silica particles are contained, surface unevenness shapes formed are lowered in compactness and, as a result, cracks or film peeling may prone to occur. Thus, it is preferable that the content of irregularly-shaped silica particles in a powder or a dispersion is as small as possible.

Irregularly-shaped silica particles and silica aggregates both look black in a TEM observation. On the other hand, flaky silica primary particles and silica secondary particles look gray or semitransparent in a TEM observation.

Scaly silica particles may be either ones on the market or ones produced for manufacture of a translucent structure. An example of scaly silica particles on the market is ones belonging to the Sunlovely (registered trademark) series manufactured by AGC Si-Tech Co., Ltd.

(Binder (d))

Examples of a binder (d) (excluding the silica precursor (a)) include an inorganic substance, a resin, or the like that dissolves or disperses in the liquid medium (b). Examples of the inorganic substance include a metal oxide precursor (metal: titanium, zirconium, or the like) other than silica. Examples of the resin include a thermoplastic resin, a thermosetting resin, and ultraviolet-setting resin.

(Additive (e))

Examples of an additive (e) include an organic compound (e1) having a polar group, an ultraviolet absorber, an infrared reflecting/absorbing agent, an antireflection agent, a surfactant for improving leveling performance, and a metal compound for improving durability.

In the case where the paint composition contains the particles (c), by causing the paint composition to contain the organic compound (e1) having a polar group, the organic compound (e1) having a polar group covers around the particles (c). As a result, particles (c) repel each other due to electrostatic force occurring in the paint composition, whereby aggregation of the particles (c) can be suppressed.

Examples of the organic compound (e1) having a polar group include an unsaturated carboxylic acid polymer, a cellulose derivative, an organic acid (excluding an unsaturated carboxylic acid polymer), and a terpene compound. The organic compound (e1) may either be of a single kind or consist of plural kinds.

Examples of the surfactant for improving leveling performance include a silicone-oil-based surfactant and an acrylic surfactant. Preferable examples of the metal compound for improving durability include zirconium chelate compound, a titanium chelate compound, and an aluminum chelate compound. Examples of the zirconium chelate compound include zirconium tetraacetylacetonate and zirconium tributoxystearate.

(Composition)

It is preferable that the total content of the silica precursor (a) and the particles (c) is in a range of 30 to 100 mass % of the solid content (100 mass %) of the paint composition (the content of the silica precursor (a) is converted into a content of $SiO_2$), and it is more preferable that the total content of the silica precursor (a) and the particles (c) is in a range of 40 to 100 mass %. In the case where the total content thereof is larger than or equal to the lower limit of the above range, the paint composition is superior in its adhesion to the translucent structure. In the case where the total content thereof is smaller than or equal to the upper limit of the above range, development of cracks in a coated film and film peeling can be suppressed.

The solid content of the paint composition is the sum of contents of all components other than the liquid medium (b) in the paint composition, provided that the content of the silica precursor (a) is converted into a content of $SiO_2$.

In the case where the particles (c) are spherical silica particles, it is preferable that the ratio of the mass of the particles (c) to the total mass (100 mass %) of the silica precursor (a) and the particles (c) is in a range of 3 to 30 mass %, and it is more preferable that the ratio thereof is in a range of 5 to 20 mass %.

In the case where the particles (c) are scaly silica particles, it is preferable that the ratio of the mass of the particles (c) to the total mass (100 mass %) of the silica precursor (a) and the particles (c) is in a range of 0.5 to 20 mass %, and it is more preferable that the ratio thereof is in a range of 1 to 15 mass %.

In the case where the ratio of the mass of the particles (c) is larger than or equal to the lower limit of the above range, even lower sparkle can be attained. In the case where the ratio of the mass of the particles (c) is lower than or equal to the upper limit of the above range, even higher antiglareness can be attained. In the case where the ratio of the mass of the silica precursor (a) is larger than or equal to a prescribed value, the strength of adhesion between a coated film and the translucent structure can be made even higher.

The content of liquid medium (b) in the paint composition is set at a value that is suitable for a concentration of the solid part of the paint composition. It is preferable that the concentration of the solid part of the paint composition with respect to the entire paint composition (100 mass %) is in a range of 0.05 to 2 mass %, and it is more preferable that the concentration of the solid part is in a range of 0.1 to 1 mass %. In the case where the concentration of the solid part is larger than or equal to the lower limit of the above range, the amount of the liquid part of the paint composition can be reduced. In the case where the concentration of the solid part is smaller than or equal to the upper limit of the above range, surface unevenness shapes having second projections can be formed easily and the area ratio of surface flat regions can be reduced easily. Furthermore, the uniformity of the film thickness of a coated film can be increased.

Usually, the content, in the paint composition, of the liquid medium (b1) whose boiling temperature is lower than or equal to 150° C. is larger than or equal to 86 mass % of the total amount of the liquid medium (b). In the case where the content of the liquid medium (b1) is larger than or equal to 86 mass % of the total amount of the liquid medium (b), surface unevenness shapes are formed when the paint composition is applied to the translucent structure using an electrostatic coating machine that is equipped with an electrostatic coating gun having a rotary atomizing head and is then baked. In the case where the ratio of the liquid medium (b1) is smaller than 86 mass %, smoothing occurs before volatilization and drying of the solvent and, as a result, surface unevenness shapes may not be formed.

It is preferable that the content of the liquid medium (b1) is larger than or equal to 90 mass % of the total amount of the liquid medium (b). The content of the liquid medium (b1) may be 100 mass % of the total amount of the liquid medium (b).

(Viscosity)

It is preferable that the viscosity (hereinafter also referred to as "liquid viscosity") of the paint composition at an application temperature is lower than or equal to 0.003 Pa·s, and it is particularly preferable that the liquid viscosity thereof is in a range of 0.001 to 0.003 Pa·s. In the case where the liquid viscosity is lower than or equal to the upper limit of the above range, droplets that are formed when the paint composition is sprayed are made finer and hence desired surface unevenness shapes can be formed easily. In the case where the liquid viscosity is higher than or equal to the lower limit of the above range, uniform surface unevenness shapes can be formed. Viscosity of the paint composition is measured by a B-type viscometer.

[Coating Process]

A paint composition is applied to the surface of a translucent structure by spraying it while charging it using, for example, an electrostatic coating machine that is equipped with an electrostatic coating gun having a rotary atomizing head. It is preferable that the temperature and the relative humidity of an atmosphere located between the rotary atomizing head and the translucent structure are set higher than or equal to 20° C. and lower than or equal to 40%, respectively, because a coated film exhibits better film properties under these conditions.

A known electrostatic coating machine can be employed as long as it is equipped with an electrostatic coating gun having a rotary atomizing head. A known electrostatic coating gun can be employed as long as it is equipped with a rotary atomizing head. However, the means of applying a paint composition is not limited to the above electrostatic coating machine; other types of known coating means can be used.

[Water-Repelling/Oil-Repelling Treatment Process]

The surface of a translucent structure may have a water-repelling/oil-repelling treated layer. Preferable water-repelling/oil-repelling treatment is application of an AFP (anti-fingerprint) agent. For example, specific, preferable AFP agents on the market are Afluid (registered trademark) S-550 (tradename) manufactured by AGC Inc., KP-801 (tradename) manufactured by Shin-Etsu Chemical Co., Ltd., X-71 (tradename) manufactured by Shin-Etsu Chemical Co., Ltd., KY-130 (tradename) manufactured by Shin-Etsu Chemical Co., Ltd., KY-178 (tradename) manufactured by Shin-Etsu Chemical Co., Ltd., KY-185 (tradename) manufactured by Shin-Etsu Chemical Co., Ltd., and Optool (registered trademark) DSX (tradename) manufactured by Daikin Industries, Ltd.

[Baking Process]

In a baking process, surface unevenness shapes are formed by baking a coated film of a paint composition formed on the surface of the translucent structure in the coating process. Baking may be performed at the same time as the coating by heating the translucent structure when a paint composition is applied to the surface of the translucent structure. Alternatively, a coated film may be heated after application of a paint composition on the surface of the translucent structure. It is preferable that the baking temperature is higher than or equal to 30° C. In the case where the translucent structure is, for example, a glass, it is more preferable that the baking temperature is in a range of 100° C. to 750° C., and it is further preferable that the baking temperature is in a range of 150° C. to 550° C.

In the above-described manufacturing method, prescribed unevenness shapes can be formed on the surface of a translucent structure by applying a prescribed paint composition on the surface of the translucent structure and then heating the coated film.

Figure 6:
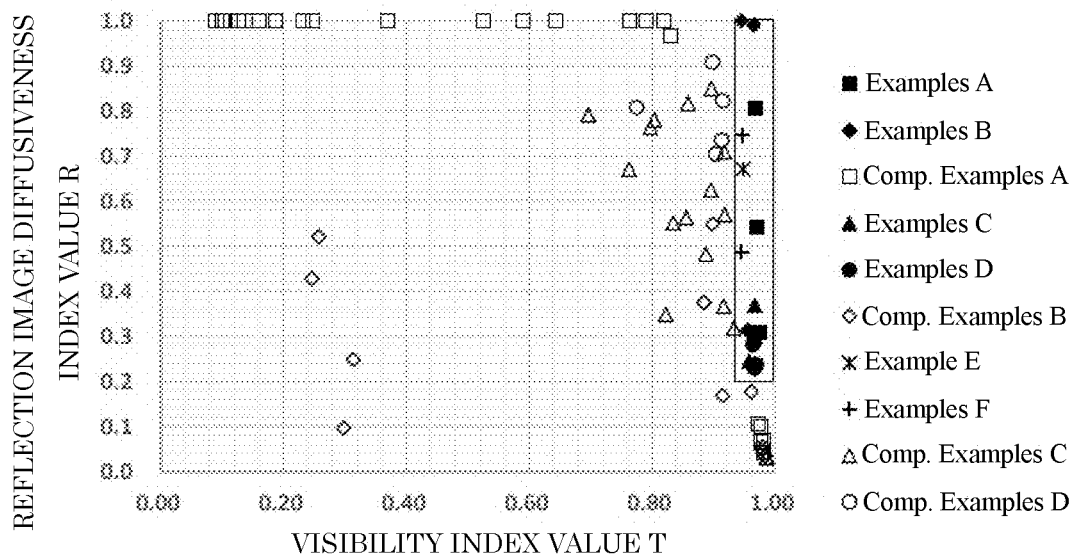
FIG. 6 is a graph showing a relationship between the visibility index value T and the reflection image diffusiveness index value R in Examples and Comparative Examples.

FIG. 6 is a graph showing a relationship between the visibility index value T and the reflection image diffusiveness index value R in translucent structures produced by the above-described glass etching method and antiglare film forming method. It is seen from FIG. 6 that the reflection image diffusiveness index value R can be increased while the visibility index value T is kept the same. Furthermore, by introducing, as a new index, the sparkle index value Z to be used for suppressing sparkle, it is understood that ideal translucent structures can be obtained in which the reflection image diffusiveness index value R, the visibility index value T, and the sparkle index value Z are set in proper ranges, respectively (see FIG. 9).

Thus, by performing simulation analyses, the present inventors have found that it is possible to attain high antiglare performance and high visibility at the same time in a translucent structure by forming surface unevenness shapes in which an area ratio of surface flat regions (described later) is reduced, a projection density (described later) is reduced, a projection area ratio (described later) is made to fall within a range of 5.5% to 50%, a skewness (the degree of non-symmetry; described later) is made to fall within a range of −0.5 to 1.1, a load area factor Smr1 (described later) at the boundary between a projected mountain portion and a core portion is reduced, and arithmetic average surface roughness Sa is made small.

In the translucent structure according to the present invention which is based on the above knowledge, surface unevenness shapes satisfy the following conditions.

(Area Ratio of Surface Flat Regions)

In this specification, the term "area ratio of surface flat regions" means the area ratio of regions where the angle (surface angle) formed by the surface of a translucent structure and the flat plane is in a range of 0° to 0.5°.

In this specification, an area ratio of surface flat regions was determined according to the following procedure. An XYZ measurement was performed in an observation area of (111 to 148) μm×(101 to 135) μm using a laser microscope, type number VK-X210 manufactured by Keyence Corporation with the magnification of an object lens set at 100. The total number of sampling data is 2,048×1,536=3,145,728.

Based on this data, gradients (referred to as "surface gradients" below) of normal vectors with respect to the normal to the main surface of the translucent structure were calculated according to a procedure to be described later. The ratio, to the entire area, of regions in each 0.1° angular range of 0° to 90° was calculated and the area ratio of surface flat regions was defined as the sum of calculated ratios of regions in a range of 0° to 0.5°.

In the translucent structure according to the present invention, the area ratio of surface flat regions of surface unevenness shapes is in a range of 0% to 5.8%, and high antiglare performance and high visibility can thus be attained at the same time. The area ratio of surface flat regions being in a range of 0.115% to 0.46% is preferable because high antiglare performance and high visibility and, in addition, low sparkle can be attained at the same time. The area ratio of surface flat regions being larger than 5.8% is improper because the proportion of occurrences of specular reflection become so large that the reflection image diffusiveness index value R is made too small in a comparison made among samples having the same visibility index value T. The area ratio of surface flat regions of surface unevenness shapes may be in a range of 0% to 0.32%, may be in a range of 0.115% to 0.32%, may be in a range of 0.1% to 0.4%, and may be in a range of 0.115% to 0.4%.

(Analysis of Surface Unevenness Shapes)

Surface unevenness shapes were analyzed by measuring an area (hereinafter referred to as an "observation area") of (101 to 111) µm×(135 to 148) µm using a laser microscope VK-X210 manufactured by Keyence Corporation in a high-resolution mode with a Z-direction measurement interval 0.01 µm and analyzing resulting xyz data representing surface shapes in the observation area using image processing software SPIP ver. 6.4.3 of Image Metrology A/S.

In the above analysis, first, gradient corrections were performed by an average profile fit method and Z offsetting was performed with a bearing height (BH) set at 0. Subsequently, a threshold value was set at 0.05 µm in a particle detection mode of the analysis, "Save whole of shape" was selected, and a filter size of shape outline smoothing was set at 51 points.

A projection density, arithmetic average surface roughness Sa, a projection area ratio, a skewness (the degree of non-symmetry) Ssk, and a load area factor Smr1 at the boundary between a projected mountain portion and a core portion that are determined in the above analysis will be described below.

(Projection Density)

Figure 3:
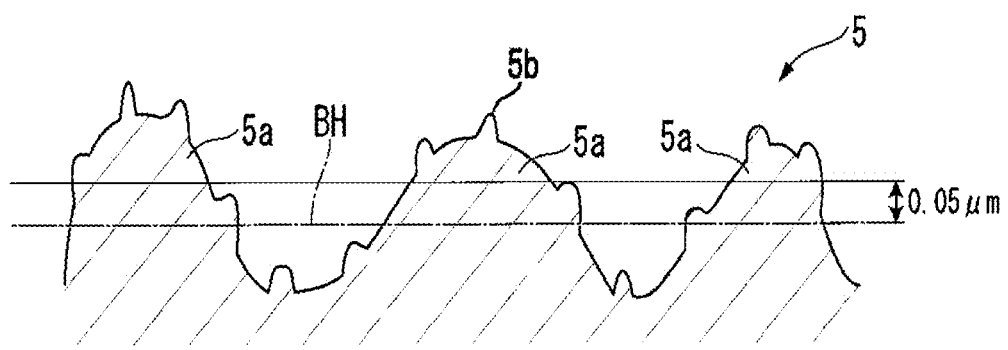
FIG. 3 is a sectional view showing one example of surface unevenness shapes of a translucent structure according to the present invention.

The projection density will be described with reference to FIG. 3. FIG. 3 is a sectional view showing an example of surface unevenness shapes of a translucent structure. The surface unevenness shapes 5 of the translucent structure shown in FIG. 3 has plural first projections 5a. Second projections 5b may exist on each first projection 5a.

In this specification, the term "first projection 5a" means a projection, having a diameter (converted into a true circle) that is larger than or equal to 1 µm at a height that is the bearing height (BH) plus 0.05 µm, in a surface shape of a translucent structure (see FIG. 3). Laser microscope data is analyzed using the surface shape analyzing software SNP ver. 6.4.3, and the projection density ($/µm^2$) (i.e., the number of first projections 5a as defined above existing per 1 $µm^2$) is defined as the number (shape count), divided by the area of the observation area, of first projections 5a as defined above observed in the observation area.

The bearing height (BH) is a most dominant height z in a height histogram that is obtained from xyz data of surface shapes in the observation area obtained by performing a measurement in the observation area by a laser microscope, after performing gradient corrections by the average profile fit method. The height z in xyz data is a height with respect to a lowest point in the observation area (i.e., a length of a perpendicular from a height z measuring position to a plane that is parallel with the main surface of the substrate and contains the lowest point in the observation area). This definition also applies to a height of a surface shape for which no reference will be set below. The interval (bin) of the histogram that was obtained in calculating a bearing height is set at 1,000.

In the translucent structure according to the present invention, high antiglareness and high visibility can be attained at the same time because the projection density of surface unevenness shapes is made to fall within a range of $0.0001/µm^2$ to $0.05/µm^2$. The projection density being in a range of $0.0048/µm^2$ to $0.05/µm^2$ is even preferable because low sparkle can also be attained at the same time.

The value $0.0001/µm^2$ is the lower limit of this measuring method. As the projection density of surface unevenness shapes decreases, projection diameters as mentioned above increase and angles that surface unevenness shapes form with the flat surface increase.

There are tendencies that the arithmetic average surface roughness Sa increases and the range of the arithmetic average surface roughness Sa widens as the projection density decreases. The projection density being small means that projections have long intervals. It is preferable that the projection density is in a prescribed range because long intervals cause high sparkle and short intervals cause a large haze factor.

(Arithmetic Average Surface Roughness Sa)

This specification employs the arithmetic average surface roughness Sa that is prescribed in ISO 25178. Such arithmetic average surface roughness Sa, that is, arithmetic average roughness (Ra) of three-dimensional surface roughness can be measured using, for example, the laser microscope VK-X210 manufactured by Keyence Corporation.

In the translucent structure according to the present invention, high antiglareness and high visibility can be attained at the same time because the arithmetic average surface roughness Sa of surface unevenness shapes is in a range of 0.06 µm to 0.143 µm. The arithmetic average surface roughness Sa being in a range of 0.075 µm to 0.143 µm or 0.06 µm to 0.1 µm is even preferable because high antiglareness and high visibility and, in addition, low sparkle can be attained at the same time. The antiglareness, that is, the reflection image diffusiveness index value R, increases as the arithmetic average surface roughness Sa increases. High antiglareness cannot be attained if the arithmetic average surface roughness Sa is lower than 0.06 µm in which case the reflection image diffusiveness index value R is smaller than 0.2. The visibility index value T becomes smaller than 0.94 if the arithmetic average surface roughness Sa exceeds 0.143 µm, and becomes smaller than 0.85 if the arithmetic average surface roughness Sa exceeds 0.23 µm.

(Projection Area Ratio)

As described in connection with the projection density, as shown in FIG. 3, the term "first projection 5a" means a projection, having a diameter (converted into a true circle) that is larger than or equal to 1 µm at a height that is the bearing height (BH) plus 0.05 mm after gradient corrections by the average profile fit method, in a surface shape of a translucent structure. The projection area ratio (%) is defined as the ratio, to the observation area, of the sum of areas that are obtained by analyzing laser microscope data using the surface shape analyzing software SPIP ver. 6.4.3 and cutting the first projections 5a as defined above by a plane located at a height that is the bearing height (BH) plus 0.05 μm.

In the translucent structure according to the present invention, high antiglareness and high visibility can be attained at the same time because the projection area ratio is in a range of 5.5% to 50%. The projection area ratio being in a range of 12% to 50% is even preferable because high antiglareness and high visibility and, in addition, low sparkle can be attained at the same time.

It is necessary to consider the projection density and the projection area ratio together. Both of the projection density and the projection area ratio being large means that the number and the sum of areas of projection regions that are larger than 1 μm in diameter when surface unevenness shapes are cut at a height that is the bearing height (BH) plus 0.05 μm in the observation area are large. In the case where the projection density is large but the projection area ratio is small, the number of projections in the observation area is large but their average area is small. In the case where the projection density is small but the projection area ratio is large, the number of projections in the observation area is small but their average area is large.

High antiglareness and high visibility can be attained at the same time when the projection density is in a range of $0.0001/\mu m^2$ to $0.05/\mu m^2$ and the projection area ratio is in a range of 5.5% to 50%. High antiglareness and high visibility and, in addition, low sparkle can be attained at the same time when the projection density is in a range of $0.0048/\mu m^2$ to $0.05/\mu m^2$ and the projection area ratio is in a range of 12% to 50%.

A case that the area ratio of projection regions that are larger than 1 μm in diameter when surface unevenness shapes are cut at a height that is the bearing height (BH) plus 0.05 μm is larger than 50% means that the area of projection regions is much larger than the area of recess regions. Conversely, a case that the projection area ratio is smaller than 5.5% means that projections and recesses are low in height, resulting in low antiglareness.

(Skewness (Degree of Non-Symmetry) Ssk)

A skewness (the degree of non-symmetry) Ssk was determined in the same manner as described above in connection with the projection density, that is, xyz data that was obtained by performing a measurement in the observation area of (101 to 111) μm×(135 to 148) μm using the laser microscope VK-X210 manufactured by Keyence Corporation and represents surface shapes in the observation area was subjected to gradient corrections by the average profile fit method using the image processing software SNP ver. 6.4.3 of Image Metrology A/S and resulting data was analyzed.

In the translucent structure according to the present invention, the skewness Ssk of surface unevenness shapes is in a range of −0.5 to 1.1 because high antiglareness and high visibility can be attained at the same time.

The skewness Ssk is an index indicating the degree of symmetry of a height distribution of surface unevenness shapes. The skewness Ssk being equal to 0 indicates that the height distribution is symmetrical. The skewness Ssk being larger than 0 indicates that projections are dominant. The skewness Ssk being smaller than 0 indicates that recesses are dominant. There are general tendencies that the skewness Ssk of surface unevenness shapes formed by coating treatment is larger than 0 and that the skewness Ssk of surface unevenness shapes formed by etching treatment is smaller than 0. Recesses become too flat if projections are too dominant and, conversely, projections become too flat if recesses are too dominant. Thus, in order to reduce the area ratio of surface flat regions, it is preferable that the skewness Ssk is in a prescribed range including 0.

(Load Area Factor Smr1 at the Boundary Between a Projected Mountain Portion and a Core Portion)

A load area factor Smr1 at the boundary between a projected mountain portion and a core portion was determined in the same manner as described above in connection with the projection density, that is, xyz data that was obtained by performing a measurement in the observation area of (101 to 111) μm×(135 to 148) μm using the laser microscope VK-X210 manufactured by Keyence Corporation and represents surface shapes in the observation area was subjected to gradient corrections by the average profile fit method using the image processing software SPIP ver. 6.4.3 of Image Metrology A/S and resulting data was analyzed.

Figure 4:
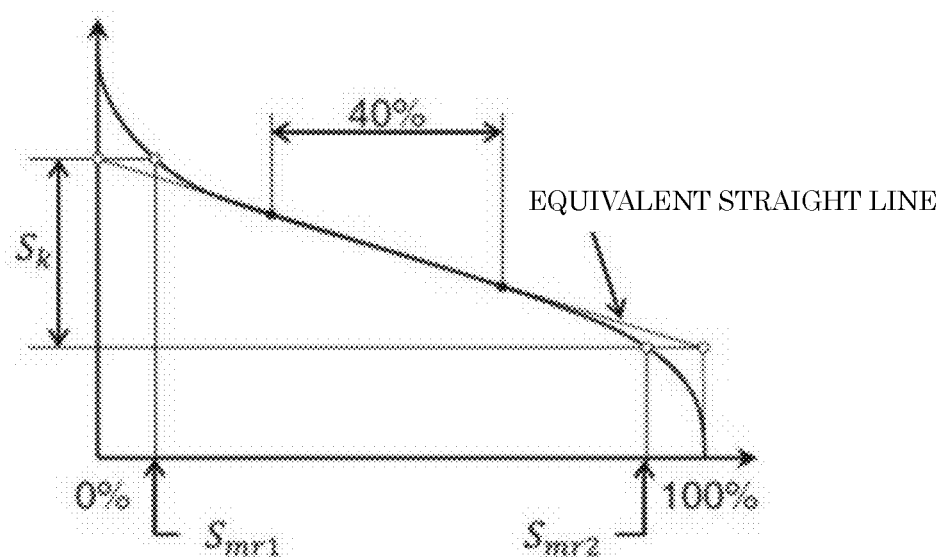
FIG. 4 is a diagram illustrating a load area factor Smr1 at the boundary between a projected mountain portion and a core portion.

A load area factor Smr1 at the boundary between a projected mountain portion and a core portion will be described with reference to FIG. 4. In FIG. 4, the vertical axis represents the surface unevenness height and the horizontal axis represents the proportion (load area factor) of the sum of areas that are obtained when surface unevennesses are cut by a horizontal plane at each height. The load curve of a surface is a curve indicating a relationship between the height and the load area factor that varies from 0% to 100%. The load area factor means the proportion of a total area of regions that are larger than or equal to a certain value c in height.

The divisional line of the load curve is drawn along the load curve between portions in which the difference therebetween in the load area ratio is 40%. A central portion of the load curve is defined as a portion where the gradient of the divisional line is smallest when the divisional line is moved starting from a load area ratio 0%. An equivalent straight line is defined as a straight line the sum of squares of whose deviations from the central portion in the vertical axis direction is smallest. A portion, included in the height corresponding to 0% to 100% range of the load area factor, of the equivalent straight line is referred to as a core portion. A portion that is higher than the core portion is referred to as a projected mountain portion. A load area factor at the boundary between the core portion and the projected mountain portion is represented by Smr1.

In the translucent structure according to the present invention, the load area factor Smr1 at the boundary between the projected mountain portion and the core portion of surface unevenness shapes is in a range of 0% to 14.5% because high antiglareness and high visibility can be attained at the same time.

In the translucent structure according to the present invention, it is preferable that the load area factor Smr1 at the boundary between the projected mountain portion and the core portion of surface unevenness shapes is in a range of 7.9% to 14.5% because high antiglareness and high visibility and, in addition, low sparkle can be attained at the same time.

The load area factor Smr1 being smaller than a prescribed value indicates that the load curve shown in FIG. 4 is close to the equivalent straight line, which means that the probability of presence of surfaces having the same height in surface shapes is lower than or equal to a prescribed value, that is, the number of surface flat regions is small and the area ratio of surface flat regions is small.

EXAMPLES

Examples A1-A4, Examples B1-B3, and Comparative Examples A1-A22

In Examples A1-A4, Examples B1-B3, and Comparative Examples A1-A22 shown in Table 1, a reflection image diffusiveness index value R, a visibility index value T, and a sparkle index value Z were calculated by performing a simulation using a Fourier optical system in which surface unevenness shapes were expressed according to an ideal conical model, according to a procedure described in the document shown below.

How to produce an ideal conical model will be described below. First, 4,096 200-μm-square flat planes (Z=0) are prepared. A cone having a prescribed gradient (e.g., 5°) is disposed at a random horizontal position in an XY plane in such a manner that its apex was set randomly in a height range of 0 to 1 μm so as to be directed downward (in the −Z direction). An ideal conical model having no flat regions was produced by repeatedly performing a manipulation of hollowing out a plane by a randomly selected cone.

Although in this example the gradient of each cone was set at 5°, the present invention is not limited to this case. The gradient of each cone need not always be fixed; cones having various gradients may be used and mixed. Alternatively, recesses having a curved surface may be formed. Although in this example the apex of each cone is directed downward, it may be directed upward in which case a plane is not hollowed out but is added with a cone. Results are shown in Table 1.

(Referential Document)
"Simulation of Anti-Glare Cover Glass Using Fourier Optics Consistent with Sparkle and Other Visual Performances," Masanobu Isshiki, SID 2017 DIGEST, pp. 1383-1386.

(Details of Simulation Procedure)
An area ratio of portions whose surface gradients with respect to the first main surface of a translucent structure are smaller than or equal to 0.5° is calculated according to the following procedure.

Surface shapes of the first main surface are measured in an observation area of (111 to 148) μm×(101 to 135) μm of the surface, formed with an antiglare film, of a translucent structure, using the laser microscope, type number VK-X210 manufactured by Keyence Corporation with the magnification of an object lens set at 100. The number of sampling data is 3,145,728 in total, that is, 2,048 (horizontal)×1,536 (vertical). Although the observation area may be different from the above for certain conditions, the following description will be directed to a case that the observation area measured 145.0 μm×108.8 μm.

Square-shaped data is obtained by preparing 2,048 (horizontal)×1,536 (vertical) sampling data in the above-described manner and removing 512 (1,537th to 2,048th; horizontal)×1,536 (vertical) data. An approximate plane is obtained for the resulting square-shaped data by the least squares method. Gradient-corrected square-shaped data was obtained by performing gradient corrections by subtracting the approximate plane from the original data. Data shown in FIG. 5 which is 3,072 (horizontal)×3,072 (vertical) synthesized square-shaped data is obtained by inverting and rotating the gradient-corrected square-shaped data.

Then 12,285 (horizontal)×12,285 (vertical) interpolated data is obtained by performing two-dimensional linear interpolation on the thus-obtained 3,072 (horizontal)×3,072 (vertical) synthesized square-shaped data in such a manner that data was added at each ¼ point of each interval between data points. The interpolation was performed using an interp2 function of MATLAB R2008b. Among "methods" for designating an interpolation method of the interp2 function, "linear" was designated.

Figure 5:
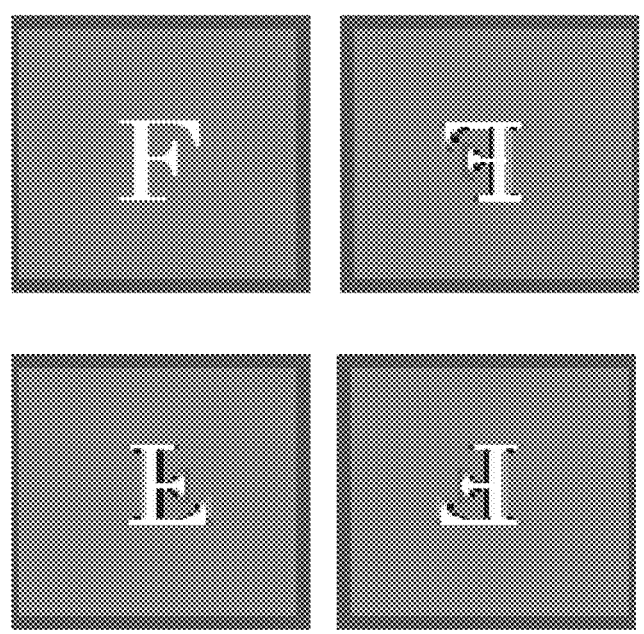
FIG. 5 shows 3,072 (horizontal)×3,072 (vertical) synthesized square-shaped data generated as an arrangement of original and inverted and/or rotated data.

Subsequently, the interpolated data is cut into LCD pixel size data. Assuming that the LCD display is 264 ppi and has a pixel size of 96.2 μm×96.2 μm, 10,856 (horizontal)×10,856 (vertical) (10,856=(96.2/108.8)×12,285) data is cut out from the interpolated data. Then 1,024 (horizontal)×1,024 (vertical) data is obtained from the cut-out data by linear interpolation and 2,048 (horizontal)×2,048 (vertical) synthesized square-shaped data-2 measuring 384.8 μm×384.8 μm is obtained again as shown in FIG. 5 by inverting and rotating the interpolated data. As in the above-described case, the linear interpolation was performed by using the interp2 function and designating "linear" among the "methods."

The thus-obtained 2,048 (horizontal)×2,048 (vertical) synthesized square-shaped data-2 measuring 384.8 μmm×384.8 μm includes data relating to height. The interval between individual meshes is 384.8 μm/2047=188 nm.

Surface gradients of the thus-obtained 2,048 (horizontal)×2,048 (vertical) synthesized square-shaped data-2 measuring 384.8 μm×384.8 μm are calculated. A surface gradients calculation method is as follows. Normal vectors of the synthesized square-shaped data-2 are calculated using a surfnorm function of MATLAB R2008b. More specifically, let Xa, Ya, and Za represent matrices as X, Y, and Z coordinates of each of 2,048×2,048 points of the synthesized square-shaped data-2. A normal vector at each point is determined by calculating surfnorm(Xa, Ya, Za). An angle formed by the normal vector at each point and a plane perpendicular to the glass surface is calculated, a histogram is produced with intervals of 0.1°, a proportion of all data points in a range of 0° to 0.5° with respect to all data points of the histogram is calculated, and an area ratio of the portions whose angles are smaller than or equal to 0.5° is determined.

Calculation methods of "clarity" and "diffusion" will be described below.

The x and y axes are set in the substrate surface and the z axis is set perpendicularly to them. The x, y, and z axes coincide with the axes of the synthesized square-shaped data-2 of the AG surface. An average height surface of the AG surface is employed as a z=0 surface and an electric field amplitude in that surface is represented by U(x, y, 0), that is, $U = \exp(i2\pi(n-1)\rho(x, y)/\lambda)$ in the case of transmission light and $U = \exp(i4m\rho(x, y)/\lambda)$ in the case of reflection light, where $\rho(x, y)$ is the z coordinate (AG height) at each point (x, y), n is the refractive index of a glass (assumed to be 1.5), and λ is the wavelength of light. Fourier transforming U(x, y, 0) and inverse-converting the Fourier transform, the followings are obtained:

$$A(k_x, k_y; z=0) = \int\int U(x, y, 0)\exp(-i(k_x x + k_y y))dxdy$$

$$U(x, y, 0) = \frac{1}{(2\pi)^2}\int\int A(k_x, k_y; z=0)\exp(i(k_x x + k_y y))dk_x dk_y$$

where λ is the wavelength of light.

Since $\exp(i(k_x x+k_y y))$ represents a plane wave having a wavenumber $$\bar{k} = \left(k_x, k_y, \sqrt{\left(\frac{2\pi}{\lambda}\right)^2 - k_y^2 - k_y^2}\right),$$

$$|A(k_x, k_y; z=0)|^2$$

represents the intensity of a plane wave having the wavenumber $\bar{k}$. It is possible to determine θ-dependency of scattering light by converting $\bar{k}$ into a corresponding parameter in the spherical coordinate system $(2\pi/\lambda, \theta, \varphi)$ and integrating $|A(k_x, k_y; z=0)|^2$ in the φ direction, where θ is the angle formed by the Z axis and $\bar{k}$ and φ is the azimuth angle in the XY plane. A scattering light angular distribution as measured by the gonio-photometer GC5000L can be determined from this scattering light angular distribution. "Clarity" and "diffusion" can be calculated from the scattering light angular distribution.

"Clarity" and "diffusion" were calculated by referring to the method described in Japanese Patent No. 5,867,649. Japanese Patent No. 5,867,649 states that a transmission light angular distribution and a reflection light angular distribution are measured by varying the angle of the detector of the gonio-photometer GC5000L and the visibility index value T and the reflection image diffusiveness index value R are defined by the following equations:

(Visibility index value *T*)={(luminance of all transmission light)−(luminance of 0° transmission light)}/(luminance of all transmission light);

(Reflection image diffusiveness index value *R*)={(luminance of all reflection light)−(luminance of 45° specular reflection light)}/(luminance of all reflection light).

In the case of reflection, since light is incident on the AG surface from the 45° direction with respect to its normal direction, specular reflection light goes in the 45° direction. However, in the simulation, since the incident angle of incident light was assumed to be 0°, the following equation was employed:

Diffusion={(luminance of all reflection light)−(luminance of 0° specular reflection light)}/(luminance of all reflection light).

On the other hand, "clarity" which relates to transmission light and is an index meaning a better characteristic as it comes closer to 1 (opposite to the case of Japanese Patent No. 5,867,649) was defined as follows:

Clarity=(luminance of 0° transmission light)}/(luminance of all transmission light).

Whereas GC5000L produces 1°-interval data, in the simulation integration was performed in the φ direction with 0.1° intervals for θ. Calculations were performed in such a manner that components in a range of −0.7° to +0.7° were assumed as 0° transmission light or 0° specular reflection light.

A visibility index value T and a reflection image diffusiveness index value R are obtained by making conversion equations by comparing obtained clarity calculation values t and diffusion calculation values r with clarity measurement values and diffusion measurement values measured for the same samples and performing conversion. Conversion equations used were T=0.9439×t+0.0742 and R=0.0267×EXP (3.7726×r).

(Calculation Method of Sparkle Index Value (Anti-Sparkle) Z)

When a person watches a display device, his or her eyes are focused on pixels. Likewise, the eyes are focused on pixels when a person watches an image through an AG substrate. Thus, pixels that are seen by human eyes through an AG substrate are calculated according to the following procedure. It is assumed that the pixel surface has a height z=0.

First, a pixel pattern is generated. The number of data points is the same as in the synthesized square-shaped data-2. Four (2×2) equal sections are formed therein and each section is correlated with one pixel. Since a display device is assumed whose pixel pitch is 264 ppi (pixels per inch), one pixel measures 96.2 μm×96.2 μm. To simulate a green monochrome display state, an opening that measures 96.2/3 μm×96.2/1.5 μm is set at the center of each section. The electric field amplitude $U_{Pixel}(x, y, 0)$ is set equal to 1 in the openings and to 0 in the other area. This is expressed as follows using a Fourier transform formula:

$$U_{Pixel}(x, y, 0) = \frac{1}{(2\pi)^2} \int\int A(k_x, k_y; z=0)\exp(i(k_x x + k_y y))dk_x dk_y.$$

Since $A(k_x, k_y; z=0)$ represents the amplitude of a plane wave having a wavenumber $\bar{k}$, an electric field amplitude that occurs when an electric field distribution at pixels reaches the AG surface can be determined by advancing the plane wave in the z-axis direction by an optical distance $z_0$ (assumed to be 4.75 mm here) between the pixels and the AG surface.

$$U_{Pixel}(x, y, z_0) = \frac{1}{(2\pi)^2} \int\int A(k_x, k_y : z=0)$$
$$\exp\left(iz_0\sqrt{\left(\frac{2\pi}{\lambda}\right)^2 - k_y^2 - k_y^2}\right)\exp(i(k_x x + k_y y))dk_x dk_y$$

Using this $U_{Pixel}(x, y, z_0)$, a distribution of light scattered by the AG surface can be determined by the following equation:

$$A_{Pixel}(k_x,k_y;z_0)=\int\int U_{Pixel}(x,y,z_0)\exp(-i(k_x x+k_y y))dxdy$$

This scattered light reaches the eyes of an observer. Thus, an image formed at the eyes of the observer can be determined by determining an image that is formed on the pixel plane by imaginarily returning the scattered light to the pixel plane. An electric field $U_{sim}(x, y, 0)$ at the pixel plane is determined using the following equation:

$$U_{sim}(x, y, 0) = \frac{1}{(2\pi)^2} \int\int A_{Pixel}(k_x, k_y : z_0)$$
$$\exp\left(-iz_0\sqrt{\left(\frac{2\pi}{\lambda}\right)^2 - k_x^2 - k_y^2}\right)\exp(i(k_x x + k_y y))dk_x dk_y.$$

$$|U_{sim}(x, y, 0)|^2$$

represents an image that is seen by the eyes of a human.

According to the above procedure, we succeeded in obtaining a pixel image of four pixels. Since four pixels are insufficient to determine "sparkle," a pixel image of 400 pixels was obtained according to the following procedure.

The synthesized square-shaped data-2 is shifted by 10 steps in each of the vertical direction and the horizontal direction cyclically, whereby 100 (10×10) different synthesized square-shaped data-2 are obtained. One step corresponds to the 2,048 data points of the synthesized square-shaped data-2 divided by 10 equally. A pixel image of 400 pixels is obtained by determining the above-mentioned $|U_{sim}(x, y, 0)|^2$ for each of the 100 synthesized square-shaped data-2 (data of one pixel contains 1,024×1,024 data). A data matrix (20 pixels×20 pixels) of the data of these 400 pixels is denoted by Image1.

Subsequently, synthesized square-shaped data-3 is obtained by shifting the synthesized square-shaped data-2 by 5 steps in each of the vertical direction and the horizontal direction. A data matrix (20 pixels×20 pixels) of the data of the 400 pixels is obtained in the same manner as described above using the synthesized square-shaped data-3 instead of the synthesized square-shaped data-2, and is denoted by Image2. The arrangement order is made the same as in Image1.

A calculation that is similar to the "difference image method (DIM)" employed in SMS-1000 is performed using Image1 and Image2 (refer to M. E. Becker, J. Soc. Inf. Disp. 23, 472 (2015). First, Image1−Image2 is calculated in which differences are calculated for respective sets of corresponding components of the two data matrices. A moving average filter that is the same in size as one pixel is applied to the difference data. More specifically, a 1,024×1,024 square matrix in which every component is $1/1,024^2$ is produced, and this square matrix and the difference data are subjected to two-dimensional convolution. An overall standard deviation is calculated as a sparkle calculation value s.

A sparkle index value (anti-sparkle) Z is obtained by a conversion equation that is generated by making a conversion equation by comparing thus-obtained sparkle calculation values s with sparkle index values (anti-sparkle) Z measured for the same samples and performing conversion. A conversion equation used was $Z=−44.852\times s+0.9892$.

TABLE 1

|  | Area ratio of surface flat regions (0° to 0.5°) (%) | Projection density (/μm²) | Arithmetic average surface roughness Sa (μm) | Projection area ratio (%) | Skewness (degree of non-symmetry) Ssk | Load area factor Smr1 (%) at boundary between projected mountain portion and core portion | Reflection image diffusiveness index value R | Visibility index value T | Sparkle index value (anti-sparkle) Z | Haze Factor (%) |
|---|---|---|---|---|---|---|---|---|---|---|
| Ex. A1 | 0.12 | 0.0049 | 0.083 | 31.78 | 0.14 | 10.16 | 0.807 | 0.969 | 0.906 | 20.92 |
| Ex. A2 | 0.14 | 0.0051 | 0.077 | 30.29 | 0.14 | 10.16 | 0.542 | 0.972 | 0.910 | 18.62 |
| Ex. A3 | 0.16 | 0.0060 | 0.065 | 26.61 | 0.14 | 10.16 | 0.308 | 0.974 | 0.914 | 16.29 |
| Ex. A4 | 0.16 | 0.0053 | 0.071 | 28.53 | 0.14 | 10.16 | 0.308 | 0.974 | 0.914 | 16.29 |
| Ex. B1 | 5.79 | 0.0002 | 0.115 | 29.39 | 0.25 | 13.48 | 0.313 | 0.956 | 0.000 | 0.00 |
| Ex. B2 | 0.06 | 0.0039 | 0.118 | 38.03 | 0.14 | 10.16 | 1.000 | 0.946 | 0.891 | 33.08 |
| Ex. B3 | 0.10 | 0.0043 | 0.089 | 33.11 | 0.14 | 10.16 | 0.991 | 0.966 | 0.903 | 23.15 |
| Comp. Ex. A1 | 0.01 | 0.0001 | 1.842 | 40.88 | 0.25 | 13.48 | 1.000 | 0.090 | 0.655 | 55.80 |
| Comp. Ex. A2 | 0.02 | 0.0001 | 0.697 | 45.06 | 0.07 | 9.67 | 1.000 | 0.105 | 0.801 | 54.61 |
| Comp. Ex. A3 | 0.02 | 0.0002 | 0.914 | 44.49 | 0.06 | 9.59 | 1.000 | 0.100 | 0.807 | 55.20 |
| Comp. Ex. A4 | 0.02 | 0.0002 | 0.408 | 45.71 | 0.13 | 10.10 | 1.000 | 0.137 | 0.848 | 52.28 |
| Comp. Ex. A5 | 0.02 | 0.0002 | 0.471 | 50.03 | 0.17 | 10.39 | 1.000 | 0.126 | 0.766 | 53.13 |
| Comp. Ex. A6 | 0.02 | 0.0003 | 0.351 | 44.99 | 0.16 | 10.39 | 1.000 | 0.161 | 0.811 | 50.90 |
| Comp. Ex. A7 | 0.02 | 0.0002 | 0.293 | 48.16 | 0.14 | 10.11 | 1.000 | 0.247 | 0.831 | 48.28 |
| Comp. Ex. A8 | 0.03 | 0.0003 | 0.235 | 49.62 | 0.13 | 10.06 | 1.000 | 0.525 | 0.826 | 44.65 |
| Comp. Ex. A9 | 0.04 | 0.0002 | 0.353 | 48.88 | 0.17 | 10.39 | 1.000 | 0.187 | 0.782 | 45.33 |
| Comp. Ex. A10 | 0.04 | 0.0012 | 0.178 | 43.09 | 0.15 | 10.17 | 1.000 | 0.819 | 0.842 | 41.36 |
| Comp. Ex. A11 | 0.04 | 0.0004 | 0.263 | 43.44 | 0.16 | 10.39 | 1.000 | 0.371 | 0.774 | 40.56 |
| Comp. Ex. A12 | 0.04 | 0.0002 | 0.306 | 44.43 | 0.13 | 10.10 | 1.000 | 0.231 | 0.819 | 43.23 |
| Comp. Ex. A13 | 0.04 | 0.0003 | 0.220 | 46.26 | 0.14 | 10.11 | 1.000 | 0.589 | 0.798 | 37.26 |
| Comp. Ex. A14 | 0.05 | 0.0003 | 0.177 | 47.20 | 0.13 | 10.06 | 1.000 | 0.791 | 0.784 | 34.24 |
| Comp. Ex. A15 | 0.08 | 0.0003 | 0.204 | 41.82 | 0.13 | 10.10 | 1.000 | 0.643 | 0.690 | 22.77 |
| Comp. Ex. A16 | 0.09 | 0.0004 | 0.175 | 40.41 | 0.16 | 10.39 | 1.000 | 0.764 | 0.719 | 22.20 |
| Comp. Ex. A17 | 1.07 | 0.0002 | 0.230 | 35.04 | 0.25 | 13.48 | 0.966 | 0.831 | 0.000 | 0.00 |
| Comp. Ex. A18 | 0.13 | 0.01213 | 0.059 | 31.26 | 0.15 | 10.21 | 0.068 | 0.982 | 0.957 | 13.61 |
| Comp. Ex. A19 | 0.23 | 0.00654 | 0.059 | 24.43 | 0.14 | 10.16 | 0.100 | 0.978 | 0.923 | 11.57 |
| Comp. Ex. A20 | 6.18 | 0.00049 | 0.057 | 21.79 | 0.06 | 9.59 | 0.106 | 0.973 | 0.556 | 0.00 |
| Comp. Ex. A21 | 6.46 | 0.00062 | 0.044 | 16.97 | 0.07 | 9.67 | 0.065 | 0.977 | 0.735 | 0.00 |
| Comp. Ex. A22 | 7.04 | 0.00119 | 0.029 | 10.55 | 0.17 | 10.39 | 0.041 | 0.982 | 0.828 | 0.00 |

The reflection image diffusiveness index value R is in a range of 0.2 to 1 and the visibility index value T is in a range of 0.94 to 1 in Examples A1-A4 and B1-B3 which satisfy conditions that the area ratio of surface flat regions in which the angle formed with the flat surface is in a range of 0° to 0.5° is in a range of 0% to 7.2%, the projection density is in a range of $0.0001/\mu m^2$ to $0.05/\mu m^2$, the projection area ratio is in a range of 5.5% to 53%, the skewness (the degree of non-symmetry) Ssk is in a range of −0.55 to 1.10, the load area factor Smr1 at the boundary between a projected mountain portion and a core portion is in a range of 0% to 16%, and the arithmetic average surface roughness Sa is in a range of 0.06 μm to 0.143 μm.

In Comparative Examples A1-A17 in which the arithmetic average surface roughness Sa was larger than 0.143 μm, the visibility index value T was smaller than 0.94. In Comparative Examples A18-A22 in which the arithmetic average surface roughness Sa is smaller than 0.06 μm, the reflection image diffusiveness index value R is smaller than 0.2.

Furthermore, the sparkle index value Z is in a range of 0.845 to 1 in Examples A1-A4 which satisfy conditions that the area ratio of surface flat regions is in a range of 0.115% to 0.46%, the projection density is in a range of $0.048/\mu m^2$ to $0.05/\mu m^2$, the projection area ratio is in a range of 12% to 50%, the skewness (the degree of non-symmetry) Ssk is in a range of −0.50 to 1.10, the load area factor Smr1 at the boundary between a projected mountain portion and a core portion is in a range of 7.9% to 15%.

Example C1

In Example C1, a translucent structure was formed with surface unevenness shapes by the antiglare treatment B. An uneven film was formed on the translucent structure by an electrostatic spraying method in which a coating liquid contained scaly silica particles and a high boiling temperature solvent. The sample was left as it was for a prescribed time after the formation of the uneven film by the electrostatic spraying method to baking, whereby aggregation of liquid onto the scaly silica particles and occurrence of a leveling action to change unevenness shapes. As a result, it becomes possible to form unevenness shapes having a small area ratio of the surface flat regions. Specifically, the following procedure was performed.
[Cleaning of Translucent Structure]
Prepared as a translucent structure was a soda lime glass substrate FL1.1 manufactured by AGC Inc. which was 100 mm (vertical)×100 mm (horizontal) in size and 1.1 mm in thickness and in which the average transmittance was 90.6% in a wavelength range of 400 nm to 1,100 nm and the arithmetic average surface roughness Ra was 0.5 nm. The surface of the glass was cleaned with an aqueous sodium hydrogen carbonate solution, rinsed with deionized water, and dried.
[Paint Composition]
A paint composition was prepared according to the following procedure. Solmix AP-11 (tradename of Japan Alcohol Trading Co., Ltd.) was used as a main solvent. Particles-containing silica precursor solution was obtained by adding tetraethoxy silane (TEOS), organic silane, a particle dispersion liquid, pure water, and nitric acid in this order so as to obtain a composition and an $SiO_2$-converted solid concentration shown in Table 2 and performing mixing at 60° C. for 60 minutes while stirring using a magnetic stirrer. The contents of TEOS, organic silane, and the particle dispersion liquid are shown in the form of a silica-converted solid ratio.

A Sunlovely (SLV) particle dispersion liquid was a dispersion liquid of scaly silica particles obtained by disintegrating and dispersing Sunlovely LFS HN150 manufactured by AGC Si-Tech Co., Ltd. in which water was used as a dispersion medium, the average particle diameter was 185 nm, the average aspect ratio ((average particle diameter)/(average thickness)) was 80, and the solid concentration was 5 wt %.

A coating liquid was obtained by diluting the thus-obtained particles-containing silica precursor solution with AP-11 so as to obtain the $SiO_2$-converted solid concentration of the coating liquid shown in Table 2. According to the necessity, propylene glycol (PG) and diacetone alcohol (DAA) were added at a ratio shown in Table 2 as solvents other than AP-11.
[Electrostatic Coating Machine]
An electrostatic coating machine (electrostatic coater manufactured by Asahi Sunac Corporation) which is equipped with an electrostatic coating gun was prepared. The electrostatic coating gun was a rotary atomizing automatic electrostatic gun Sunbell ESA120 manufactured by Asahi Sunac Corporation which had a cup diameter 70 mm. To facilitate grounding of the translucent structure, a metal mesh tray was prepared as a conductive substrate.
[Electrostatic Coating]
In a coating booth of the electrostatic coating machine, the temperature and the humidity were adjusted to be in ranges of 23° C.±1° C. and 50%±10%, respectively.

A cleaned translucent structure that had been heated to 30° C.±3° C. in advance was put on a chain conveyor of the electrostatic coating machine via the conductive substrate. While the translucent structure was conveyed at a constant speed by the chain conveyor, a coating liquid in a temperature range 23° C.±1° C. was applied to a T surface (opposite to a surface that was brought into contact with molten tin during manufacture of a float process) of the translucent structure. Then the translucent structure was subjected to baking at 300° C. in the air for 60 minutes, whereby surface unevenness shapes were formed.

As for the coating conditions, the coating liquid supply rate was 24 mL/min, the conveyance speed was 3.0 m/min, the turbine rotation speed was 35 krpm, the nozzle height was 260 mm, (the voltage was 60 kV), the shape air pressure was 0.07 MPa, and the number of times of conveyance was two. The coating liquid supply rate is a supply rate of a paint composition to the electrostatic coating gun. The turbine rotation speed is a rotation speed of the rotary atomizing head. The nozzle height is a distance from the nozzle tip of the electrostatic coating gun (i.e., the front end of the rotary atomizing head in the paint composition spraying direction) to the translucent structure. (The voltage is a voltage that was applied to the electrostatic coating gun.)

Example C2, Examples D1-D4, and Comparative Examples B1-B10

Translucent structures of Example C2, Examples D1-D4, and Comparative Examples B1-B10 were produced in the same manner as the translucent structure of Example C1 except that the kinds of particle dispersion liquids used for preparation of a coating liquid, particle concentrations in solid part of the coating liquid, solid concentrations in the coating liquid, and coating conditions of the coating liquid were as shown in Tables 2 and 3.

The samples of Comparative Examples B1-B10 were ones that can be produced by conventional techniques using conventional coating liquids. In Examples C1 and C2 and Examples D1-D4, silica fine particles and a high boiling temperature solvent were added to the coating liquid in the electrostatic coating. It has been found that surface unevenness shapes of an antiglare film that could not be formed conventionally can be formed by leveling action and matrix aggregation around fine particles in a solidification process that occur after landing of the coating liquid onto the substrate by the electrostatic coating. As a result, it has become possible to attain, at the same time, higher antiglareness and higher visibility than in conventional translucent structures.

The particle dispersion liquid shown in the following Tables was as shown below.

(Particle Dispersion Liquid)

ST-OZL (Snowtex OZL manufactured by Nissan Chemical Corporation) which was a dispersion liquid of spherical solid silica particles and in which the dispersing solvent was water and the particle diameter was in a range of 70 nm to 100 nm.

TABLE 2

| | Coating liquid | | | | Electrostatic film forming conditions | | | | | | | Coating to baking holding time (min) | Baking conditions | |
|---|---|---|---|---|---|---|---|---|---|---|---|---|---|---|
| | Particles | | Solvent | | | | | | | | | | | |
| | Added particles | Addition amount (wt %) | Added solvents other than IPA | Addition amount (wt %) | Concentration (wt %) | Number of times of conveyance | Liquid supply rate (mL/min) | Conveyance Speed (m/min) | Nozzle height (mm) | Turbine (krpm) | Shape air (MPa) | Temp./humidity (° C/%) | | Temp. (° C.) | Time (min) |
| Ex. C1 | SLV | 10 | DAA, PG | 0.3, 0.24 | 0.5 | 2 | 24 | 3.0 | 235 | 35 | 0.07 | 23/50 | 60 | 300 | 40 |
| Ex. C2 | SLV | 10 | DAA, PG | 0.3, 0.24 | 0.5 | 2 | 24 | 3.0 | 260 | 35 | 0.07 | 23/50 | 60 | 260 | 60 |
| Ex. D1 | SLV | 10 | DAA, PG | 0.3, 0.24 | 0.5 | 2 | 24 | 3.0 | 235 | 35 | 0.07 | 23/50 | 30 | 300 | 60 |
| Ex. D2 | SLV | 10 | DAA, PG | 0.3, 0.24 | 0.5 | 2 | 24 | 3.0 | 235 | 35 | 0.07 | 23/50 | 480 | 300 | 60 |
| Ex. D3 | SLV | 10 | DAA, PG | 0.3, 0.24 | 0.5 | 2 | 24 | 3.0 | 235 | 35 | 0.07 | 23/50 | 75 | 300 | 60 |
| Ex. D4 | SLV | 10 | DAA, PG | 0.3, 0.24 | 0.5 | 2 | 24 | 3.0 | 235 | 35 | 0.07 | 23/50 | 60 | 300 | 90 |

TABLE 3

| | Coating liquid | | | | Electrostatic film forming conditions | | | | | | | Coating to baking holding time (min) | Baking conditions | |
|---|---|---|---|---|---|---|---|---|---|---|---|---|---|---|
| | Particles | | Solvent | | | | | | | | | | | |
| | Added particles | Addition amount (wt %) | Added solvents other than IPA | Addition amount (wt %) | Concentration (wt %) | Number of times of conveyance | Liquid supply rate (mL/min) | Conveyance Speed (m/min) | Nozzle height (mm) | Turbine (krpm) | Shape air (MPa) | Temp./humidity (° C/%) | | Temp. (° C.) | Time (min) |
| Comp. Ex. B1 | SLV | 15 | DAA | 1.5 | 1.5 | 6 | 28 | 2 | 245 | 35 | 0.07 | 23/50 | 60 | 300 | 60 |
| Comp. Ex. B2 | SLV | 15 | PG | 0.3 | 1.5 | 5 | 28 | 2 | 245 | 35 | 0.07 | 23/50 | 60 | 300 | 60 |
| Comp. Ex. B3 | SLV | 15 | DAA | 1 | 1.5 | 5 | 28 | 2 | 245 | 35 | 0.07 | 23/50 | 60 | 300 | 60 |
| Comp. Ex. B4 | SLV | 15 | PG | 0.5 | 1.5 | 4 | 28 | 2 | 245 | 35 | 0.07 | 23/50 | 60 | 300 | 60 |
| Comp. Ex. B5 | SLV | 9 | — | — | 0.215 | 1 | 28 | 2 | 245 | 35 | 0.07 | 23/50 | 60 | 300 | 60 |
| Comp. Ex. B6 | SLV | 15 | — | — | 0.5 | 4 | 50 | 2 | 250 | 35 | 0.07 | 23/50 | 60 | 300 | 60 |
| Comp. Ex. B7 | ST-OZL | 15 | — | — | 0.215 | 3 | 28 | 2 | 245 | 35 | 0,07 | 23/50 | 60 | 435 | 30 |
| Comp. Ex. B8 | ST-OZL | 10 | — | — | 0.215 | 2 | 28 | 2 | 245 | 35 | 0.07 | 23/50 | 60 | 300 | 60 |
| Comp. Ex. B9 | — | — | — | — | 0.20 | 1 | 28 | 2 | 245 | 35 | 0.07 | 23/50 | 60 | 435 | 30 |
| Comp. Ex. B10 | SLV | 15 | — | — | 0.5 | 4 | 30 | 2 | 255 | 35 | 0.07 | 23/50 | 60 | 300 | 60 |

Example E1

In Example E1, a translucent structure was formed with surface unevenness shapes by the antiglare treatment A. Specifically, the following procedure was performed.

To perform the antiglare treatment A as unevenness forming processing on only one side of a glass plate, a protective film made of a substance that is insoluble to an aqueous solution of hydrofluoric acid was stuck to an arbitrary one main surface of the glass plate. The antiglare treatment A was performed on the opposite main surface of the glass plate, whereby a substrate was produced only one surface of which was formed with unevenness shapes.

The antiglare treatment A included four steps, that is, preliminary cleaning, cleaning, immersion in a chemical liquid, and cleaning. The substrate to which the protective film was stuck was immersed in an aqueous solution of hydrofluoric acid (5 wt %) for 180 seconds, whereby things stuck to the substrate surface such as dust, oils and fats were removed. Then the substrate was immersed in pure water for 30 seconds and cleaned. This cleaning step was performed three times, and then an aqueous solution of hydrofluoric acid remaining on the substrate surface was removed sufficiently.

Subsequently, the substrate was immersed slowly in a frosting solution whose concentration was adjusted as shown in Table 4 (Example E1) and left as it was for 180 seconds, whereby the substrate surface was formed with unevenness shapes. Finally, the substrate was immersed in pure water for 30 seconds, cleaned, and dried, whereby a processed substrate was obtained (see Table 4).

Portions of the surface layer of the glass substrate immersed in the frosting liquid are dissolved by hydrofluoric acid to produce silicon fluoride ions. Potassium fluoride and ammonium fluoride contained in the frosting liquid cause salts insoluble to silicon fluoride ions to be deposited on portions of the substrate surface. Whereas the portions of the glass substrate covered with the salts do not dissolve any further, the portions of the glass substrate not covered with the salts continue to dissolve. As a result, unevenness shapes are formed. How the unevenness shapes are formed is determined by a substrate dissolving rate and a deposition rate and shapes of salts to cover the substrate surface.

In conventional frosting processing, a mixed liquid of potassium fluoride or ammonium fluoride and hydrofluoric acid is used as a frosting liquid. Etching is performed additionally after formation of unevenness shapes, whereby spoon cut unevenness shapes are obtained. In a substrate that has been immersed in this chemical liquid, sharp crystals are deposited on the substrate surface and hence unevenness shapes become so sharp as to scatter light too strongly. As a result, an image carried by light that has passed through the substrate becomes too low in visibility. It is therefore necessary to adjust the degree of scattering by smoothing the surface by the additional etching.

Although the additional etching can adjust the degree of scattering to a desired level, only spoon cut shapes can be formed on the substrate surface because the etching is isotropic. Having flat portions, spoon cut shapes cannot attain both of high "diffusion" and high "clarity," as mentioned above.

In the present invention, the area ratio of surface flat regions can be lowered with high arithmetic average surface roughness Sa by forming proper unevenness shapes on a substrate surface by selecting an appropriate chemical liquid and concentration thereof. As a result, a proper degree of scattering can be secured without the need for performing additional etching, whereby both of high "diffusion" and high "clarity" can be attained.

Examples F1 and F2

Samples of Examples F1 and F2 were produced under the same processing conditions as in Example E1 except for the HF concentration, the counter ion, the ion concentration, and the $AlCl_3$ addition amount (see Table 4).

TABLE 4

| | Etching conditions | | | | |
|---|---|---|---|---|---|
| | HF (wt %) | Counter ion | Ion concentration (mol/L) | $AlCl_3$ addition amount (ppm) | Processing time (sec) | Processing temp. (° C.) |
| Ex. E1 | 5.0 | $KH_2PO_4$ | 1.5 | — | 180 | 25 |
| Ex. F1 | 10.0 | KCl | 4.0 | 960 | 180 | 25 |
| Ex. F2 | 10.0 | KCl | 3.0 | — | 180 | 25 |

Comparative Examples C1-C17

Samples of Comparative Examples C1-C17 were produced under the same processing conditions as in Example E1 except for the HF concentration, the counter ion, the ion concentration, and the $AlCl_3$ addition amount (see Table 5).

TABLE 5

| | Etching conditions | | | | | |
|---|---|---|---|---|---|---|
| | HF (wt %) | Counter ion | Ion concentration (mol/L) | $AlCl_3$ addition amount (ppm) | Processing time (sec) | Processing temp. (° C.) |
| Comp. Ex. C1 | 2.0 | $KH_2PO_4$ | 1.2 | — | 180 | 25 |
| Comp. Ex. C2 | 2.0 | $KH_2PO_4$ | 1.0 | — | 180 | 25 |
| Comp. Ex. C3 | 5.0 | $KH_2PO_4$ | 1.5 | — | 180 | 25 |
| Comp. Ex. C4 | 4.0 | $KH_2PO_4$ | 1.2 | — | 180 | 25 |
| Comp. Ex. C5 | 3.0 | $KH_2PO_4$ | 1.2 | — | 180 | 25 |
| Comp. Ex. C6 | 5.0 | KCl | 4.0 | — | 180 | 25 |
| Comp. Ex. C7 | 10.0 | KCl | 4.0 | 640 | 180 | 25 |
| Comp. Ex. C8 | 10.0 | KCl | 4.0 | 320 | 180 | 25 |
| Comp. Ex. C9 | 7.5 | KCl | 3.0 | — | 180 | 25 |
| Comp. Ex. C10 | 5.0 | KCl | 1.3 | — | 180 | 25 |
| Comp. Ex. C11 | 7.5 | KCl | 2.0 | — | 180 | 25 |
| Comp. Ex. C12 | 7.5 | KCl | 4.0 | — | 180 | 25 |
| Comp. Ex. C13 | 3.0 | KCl | 1.0 | — | 180 | 25 |
| Comp. Ex. C14 | 5.0 | KCl | 1.0 | — | 180 | 25 |
| Comp. Ex. C15 | 4.0 | $K_2SO_4$ | 1.0 | — | 180 | 25 |
| Comp. Ex. C16 | 3.0 | KCl | 0.6 | — | 180 | 25 |
| Comp. Ex. C17 | 5.0 | $KNO_3$ | 1.0 | — | 180 | 25 |

Comparative Examples D1-D7

In Comparative Examples D1-D7, a translucent structure was formed with surface unevenness shapes by the antiglare treatment B.

More specifically, the following procedure was performed.

[Preliminary Etching Step]

Prepared as a translucent structure was a soda lime glass substrate FL1.1 manufactured by AGC Inc. which was 100 mm (vertical)×100 mm (horizontal) in size and 1.1 mm in thickness and in which the average transmittance was 90.6% in a wavelength range of 400 nm to 1,100 nm and the arithmetic average surface roughness Ra was 0.5 nm.

After a protective film was stuck to a B surface (opposite to a surface that was brought into contact with molten tin during manufacture of a float process) of the translucent structure, the translucent structure was immersed in a frosting treatment liquid containing hydrogen fluoride (2 wt %) and potassium fluoride (3 wt %) for 3 minutes.

[Main Etching Step]

The translucent structure was cleaned with an aqueous sodium hydrogen carbonate solution and then immersed in an aqueous solution containing hydrogen fluoride (7.5 wt %) and hydrogen chloride (7.5 wt %) for a time shown in the following Table 6.

TABLE 6

|  | Immersion time (min) |
|---|---|
| Comp. Ex. D1 | 4.7 |
| Comp. Ex. D2 | 9.0 |
| Comp. Ex. D3 | 10.3 |
| Comp. Ex. D4 | 12.0 |

TABLE 6-continued

|  | Immersion time (min) |
|---|---|
| Comp. Ex. D5 | 12.9 |
| Comp. Ex. D6 | 17.5 |
| Comp. Ex. D7 | 19.4 |

An area ratio of surface flat regions (0° to 0.5°), an arithmetic average surface roughness Sa, a projection density, a projection area ratio, a skewness (the degree of non-symmetry) Ssk, a load area factor Smr1 at the boundary between a projected mountain portion and a core portion, a reflection image diffusiveness index value R, a visibility index value T, a sparkle index value Z, and a haze factor were determined according to the above-described procedures for each of Examples C1 and C2, Examples D1-D4, Example E1, Examples F1 and F2, Comparative Examples B1-B10, Comparative Examples C1-C17, and Comparative Examples D1-D7. Results are shown in the following Tables 7-11.

TABLE 7

|  | Area ratio of surface flat regions (0° to 0.5°) (%) | Projection density (/μm²) | Arithmetic average surface roughness Sa (μm) | Projection area ratio (%) | Skewness (degree of non-symmetry) Ssk | Load area factor Smr1 (%) at boundary between projected mountain portion and core portion | Reflection image diffusiveness index value R | Visibility index value T | Sparkle index value (anti-sparkle) Z | Haze Factor (%) |
|---|---|---|---|---|---|---|---|---|---|---|
| Ex. C1 | 0.38 | 0.0157 | 0.081 | 20.81 | 0.44 | 7.93 | 0.369 | 0.968 | 0.846 | 10.22 |
| Ex. C2 | 0.46 | 0.0063 | 0.089 | 49.71 | 1.08 | 14.10 | 0.245 | 0.958 | 0.848 | 12.22 |
| Ex. D1 | 0.38 | 0.0073 | 0.085 | 5.59 | 0.22 | 6.56 | 0.282 | 0.965 | 0.834 | 10.58 |
| Ex. D2 | 0.39 | 0.0090 | 0.082 | 6.97 | 0.17 | 6.44 | 0.288 | 0.967 | 0.788 | 10.01 |
| Ex. D3 | 0.42 | 0.0116 | 0.080 | 13.91 | 0.36 | 7.44 | 0.229 | 0.967 | 0.710 | 8.16 |
| Ex. D4 | 0.48 | 0.0134 | 0.074 | 15.57 | 0.60 | 7.57 | 0.238 | 0.970 | 0.832 | 8.11 |

TABLE 8

|  | Area ratio of surface flat regions (0° to 0.5°) (%) | Projection density (/μm²) | Arithmetic average surface roughness Sa (μm) | Projection area ratio (%) | Skewness (degree of non-symmetry) Ssk | Load area factor Smr1 (%) at boundary between projected mountain portion and core portion | Reflection image diffusiveness index value R | Visibility index value T | Sparkle index value (anti-sparkle) Z | Haze Factor (%) |
|---|---|---|---|---|---|---|---|---|---|---|
| Comp. Ex. B1 | 0.22 | 0.0012 | 0.497 | 46.32 | 0.90 | 11.58 | 0.521 | 0.257 | 0.838 | 47.64 |
| Comp. Ex. B2 | 0.24 | 0.0007 | 0.510 | 53.16 | 0.57 | 13.38 | 0.429 | 0.246 | 0.812 | 47.66 |
| Comp. Ex. B3 | 0.25 | 0.0008 | 0.410 | 55.57 | 1.01 | 13.72 | 0.248 | 0.314 | 0.838 | 46.20 |
| Comp. Ex. B4 | 0.32 | 0.0011 | 0.394 | 49.98 | 0.61 | 12.49 | 0.096 | 0.298 | 0.858 | 43.78 |
| Comp. Ex. B5 | 0.44 | 0.0211 | 0.054 | 15.62 | 1.43 | 16.88 | 0.038 | 0.981 | 0.931 | 7.50 |
| Comp. Ex. B6 | 0.62 | 0.0039 | 0.156 | 55.18 | 4.48 | 14.61 | 0.230 | 0.904 | 0.787 | 26.60 |
| Comp. Ex. B7 | 0.65 | 0.0038 | 0.150 | 50.42 | 2.41 | 21.94 | 0.168 | 0.915 | 0.808 | 27.53 |
| Comp. Ex. B8 | 3.45 | 0.0037 | 0.030 | 2.14 | 0.46 | 8.05 | 0.036 | 0.984 | 0.941 | 0.00 |
| Comp. Ex. B9 | 8.32 | 0.0014 | 0.033 | 22.74 | 1.27 | 26.20 | 0.046 | 0.979 | 0.789 | 0.00 |
| Comp. Ex. B10 | 8.41 | 0.0017 | 0.041 | 12.38 | 0.34 | 7.86 | 0.035 | 0.984 | 0.837 | 0.00 |

TABLE 9

|  | Area ratio of surface flat regions (0° to 0.5°) (%) | Projection density (/μm²) | Arithmetic average surface roughness Sa (μm) | Projection area ratio (%) | Skewness (degree of non-symmetry) Ssk | Load area factor Smr1 (%) at boundary between projected mountain portion and core portion | Reflection image diffusiveness index value R | Visibility index value T | Sparkle index value (anti-sparkle) Z | Haze Factor (%) |
|---|---|---|---|---|---|---|---|---|---|---|
| Ex. E1 | 0.12 | 0.0378 | 0.143 | 12.72 | −0.49 | 8.03 | 0.671 | 0.949 | 0.908 | 37.67 |
| Ex. F1 | 0.32 | 0.0175 | 0.112 | 25.14 | −0.39 | 7.39 | 0.746 | 0.947 | 0.861 | 27.81 |
| Ex. F2 | 0.36 | 0.0142 | 0.110 | 24.79 | −0.25 | 7.66 | 0.487 | 0.945 | 0.757 | 22.51 |

TABLE 10

|  | Area ratio of surface flat regions (0° to 0.5°) (%) | Projection density (/μm²) | Arithmetic average surface roughness Sa (μm) | Projection area ratio (%) | Skewness (degree of non-symmetry) Ssk | Load area factor Smr1 (%) at boundary between projected mountain portion and core portion | Reflection image diffusiveness index value R | Visibility index value T | Sparkle index value (anti-sparkle) Z | Haze Factor (%) |
|---|---|---|---|---|---|---|---|---|---|---|
| Comp. Ex. C1 | 0.09 | 0.0132 | 0.238 | 7.05 | −0.92 | 4.63 | 0.780 | 0.804 | 0.886 | 47.44 |
| Comp. Ex. C2 | 0.11 | 0.0256 | 0.215 | 26.60 | −0.93 | 6.45 | 0.816 | 0.859 | 0.895 | 47.46 |
| Comp. Ex. C3 | 0.11 | 0.0287 | 0.175 | 28.48 | −0.57 | 5.57 | 0.367 | 0.917 | 0.895 | 42.30 |
| Comp. Ex. C4 | 0.11 | 0.0363 | 0.161 | 13.72 | −0.27 | 6.33 | 0.317 | 0.934 | 0.920 | 40.37 |
| Comp. Ex. C5 | 0.11 | 0.0247 | 0.184 | 22.26 | −0.78 | 6.34 | 0.849 | 0.897 | 0.894 | 43.29 |
| Comp. Ex. C6 | 0.28 | 0.0071 | 0.197 | 15.22 | −0.89 | 5.04 | 0.763 | 0.797 | 0.664 | 34.45 |
| Comp. Ex. C7 | 0.32 | 0.0126 | 0.128 | 26.04 | −0.58 | 6.99 | 0.570 | 0.918 | 0.782 | 26.67 |
| Comp. Ex. C8 | 0.37 | 0.0040 | 0.167 | 10.47 | −0.33 | 5.21 | 0.552 | 0.834 | 0.632 | 24.46 |
| Comp. Ex. C9 | 0.37 | 0.1834 | 0.129 | 0.43 | −0.64 | 9.44 | 0.709 | 0.918 | 0.819 | 25.43 |
| Comp. Ex. C10 | 0.37 | 0.0053 | 0.182 | 26.27 | −0.58 | 7.18 | 0.671 | 0.763 | 0.675 | 27.14 |
| Comp. Ex. C11 | 0.40 | 0.0966 | 0.139 | 0.43 | −0.35 | 10.64 | 0.624 | 0.896 | 0.796 | 23.84 |
| Comp. Ex. C12 | 0.40 | 0.0068 | 0.153 | 23.04 | −0.76 | 6.75 | 0.482 | 0.888 | 0.682 | 24.97 |
| Comp. Ex. C13 | 0.41 | 0.0035 | 0.233 | 21.53 | −0.73 | 7.29 | 0.791 | 0.697 | 0.657 | 20.51 |
| Comp. Ex. C14 | 0.46 | 0.0048 | 0.158 | 29.50 | −0.69 | 10.17 | 0.563 | 0.856 | 0.720 | 19.36 |
| Comp. Ex. C15 | 0.53 | 0.0025 | 0.162 | 34.93 | 0.41 | 12.48 | 0.348 | 0.822 | 0.582 | 7.84 |
| Comp. Ex. C16 | 0.54 | 0.0015 | 0.035 | 0.91 | 0.04 | 9.00 | 0.032 | 0.986 | 0.940 | 0.00 |
| Comp. Ex. C17 | 0.74 | 0.0000 | 0.028 | 0.00 | −0.02 | 9.23 | 0.030 | 0.986 | 0.946 | 0.00 |

TABLE 11

|  | Area ratio of surface flat regions (0° to 0.5°) (%) | Projection density (/μm²) | Arithmetic average surface roughness Sa (μm) | Projection area ratio (%) | Skewness (degree of non-symmetry) Ssk | Load area factor Smr1 (%) at boundary between projected mountain portion and core portion | Reflection image diffusiveness index value R | Visibility index value T | Sparkle index value (anti-sparkle) Z | Haze Factor (%) |
|---|---|---|---|---|---|---|---|---|---|---|
| Comp. Ex. D1 | 0.18 | 0.0041 | 0.145 | 38.87 | −0.21 | 10.07 | 0.823 | 0.915 | 0.816 | 37.00 |
| Comp. Ex. D2 | 0.25 | 0.0013 | 0.158 | 44.87 | −0.12 | 10.76 | 0.908 | 0.899 | 0.736 | 40.16 |
| Comp. Ex. D3 | 0.33 | 0.0042 | 0.144 | 33.17 | −0.15 | 9.20 | 0.735 | 0.913 | 0.867 | 32.52 |
| Comp. Ex. D4 | 0.39 | 0.0326 | 0.065 | 15.21 | 1.90 | 8.41 | 0.053 | 0.980 | 0.935 | 14.69 |
| Comp. Ex. D5 | 0.39 | 0.0012 | 0.179 | 34.87 | −0.15 | 8.88 | 0.808 | 0.775 | 0.608 | 15.35 |
| Comp. Ex. D6 | 0.44 | 0.0069 | 0.141 | 0.21 | −0.70 | 7.19 | 0.704 | 0.904 | 0.829 | 26.58 |
| Comp. Ex. D7 | 1.02 | 0.0121 | 0.043 | 6.30 | 2.36 | 9.85 | 0.041 | 0.982 | 0.907 | 3.18 |

The reflection image diffusiveness index value R was in a range of 0.2 to 1 and the visibility index value T was in a range of 0.94 to 1 in Examples C1, C2, D1-D4, E1, F1, and F2 which satisfied conditions that the area ratio of surface flat regions in which the angle formed with the flat surface was in a range of 0° to 0.5° was in a range of 0% to 5.8%, the projection density was in a range of $0.0001/\mu m^2$ to $0.05/\mu m^2$, the projection area ratio was in a range of 5.5% to 50%, the skewness (the degree of non-symmetry) Ssk was in a range of −0.5 to 1.1, the load area factor Smr1 at the boundary between a projected mountain portion and a core portion was in a range of 0% to 14.5%, and the arithmetic average surface roughness Sa was in a range of 0.06 μm to 0.143 μm.

The reflection image diffusiveness index value R was in a range of 0.2 to 0.9 and the visibility index value T was in a range of 0.94 to 1 and, in addition, the sparkle index value (anti-sparkle) Z was in a range of 0.845 to 1 in Examples C1, C2, and E1 which satisfied conditions that the area ratio of surface flat regions was in a range of 0.115% to 0.46%, the projection density was in a range of $0.0048/\mu m^2$ to $0.05/\mu m^2$, the projection area ratio was in a range of 12% to 50%, the skewness (the degree of non-symmetry) Ssk was in a range of −0.5 to 1.1, the load area factor Smr1 at the boundary between a projected mountain portion and a core portion was in a range of 7.9% to 14.5%, and the arithmetic average surface roughness Sa was in a range of 0.06 μm to 0.143 μm.

The reflection image diffusiveness index value R was in a range of 0.5 to 1 and the visibility index value T was in a range of 0.945 to 1 in Examples E1 and F1 which satisfied conditions that the area ratio of surface flat regions was in a range of 0% to 0.32%, the projection density was in a range of $0.0001/\mu m^2$ to $0.05/\mu m^2$, the projection area ratio was in a range of 5.5% to 50%, the skewness (the degree of non-symmetry) Ssk was in a range of −0.50 to 1.10, the load area factor Smr1 at the boundary between a projected mountain portion and a core portion was in a range of 0% to 14.5%, and the arithmetic average surface roughness Sa was in a range of 0.075 μm to 0.143 μm.

The reflection image diffusiveness index value R was in a range of 0.5 to 0.9 and the visibility index value T was in a range of 0.945 to 1 and, in addition, the sparkle index value (anti-sparkle) Z was in a range of 0.905 to 1 in Example E1 which satisfied conditions that the area ratio of surface flat regions was in a range of 0.115% to 0.32%, the projection density was in a range of $0.0048/\mu m^2$ to $0.05/\mu m^2$, the projection area ratio was in a range of 12% to 50%, the skewness (the degree of non-symmetry) Ssk was in a range of −0.5 to 1.1, the load area factor Smr1 at the boundary between a projected mountain portion and a core portion was in a range of 7.9% to 14.5%, and the arithmetic average surface roughness Sa was in a range of 0.075 μm to 0.143 μm.

The reflection image diffusiveness index value R was in a range of 0.25 to 1 and the visibility index value T was in a range of 0.96 to 1 in Examples C1, D1, and D2 which satisfied conditions that the area ratio of surface flat regions was in a range of 0.1% to 0.4%, the projection density was in a range of $0.0001/\mu m^2$ to $0.05/\mu m^2$, the projection area ratio was in a range of 5.5% to 50%, the skewness (the degree of non-symmetry) Ssk was in a range of −0.5 to 1.1, the load area factor Smr1 at the boundary between a projected mountain portion and a core portion was in a range of 0% to 14.5%, and the arithmetic average surface roughness Sa was in a range of 0.06 μm to 0.1 μm.

The reflection image diffusiveness index value R was in a range of 0.25 to 0.65 and the visibility index value T was in a range of 0.96 to 1 and, in addition, the sparkle index value (anti-sparkle) Z was in a range of 0.84 to 1 in Example C1 which satisfied conditions that the area ratio of surface flat regions was in a range of 0.115% to 0.4%, the projection density was in a range of $0.0048/\mu m^2$ to $0.05/\mu m^2$, the projection area ratio was in a range of 12% to 50%, the skewness (the degree of non-symmetry) Ssk was in a range of −0.5 to 1.1, the load area factor Smr1 at the boundary between a projected mountain portion and a core portion was in a range of 7.9% to 14.5%, and the arithmetic average surface roughness Sa was in a range of 0.06 μm to 0.1 μm.

The reflection image diffusiveness index value R was in a range of 0.30 to 1 and the visibility index value T was in a range of 0.96 to 1 and, in addition, the sparkle index value (anti-sparkle) Z was in a range of 0.84 to 1 in Examples A1, A2, A3 and A4, Example B3, and Example C1 which satisfied conditions that that the area ratio of surface flat regions was in a range of 0.1% to 0.4%, the projection density was in a range of $0.0040/\mu m^2$ to $0.016/\mu m^2$, the projection area ratio was in a range of 20% to 34%, the skewness (the degree of non-symmetry) Ssk was in a range of 0.14 to 0.45, the load area factor Smr1 at the boundary between a projected mountain portion and a core portion was in a range of 7.8% to 10.17%, and the arithmetic average surface roughness Sa was in a range of 0.06 μm to 0.1 μm.

Comparative Examples B1-B10 did not satisfy the following conditions:

Comparative Examples B9 and B10 did not satisfy the area ratio of surface flat regions (0° to 0.5°) of in a range of 0% to 5.8%.

Comparative Examples B1-B10 did not satisfy the arithmetic average surface roughness Sa of in a range of 0.06 μm to 0.143 μm.

Comparative Examples B2, B3, B6, and B8 did not satisfy the projection area ratio of in a range of 5.5% to 50%.

Comparative Examples B5-B7 and B9 did not satisfy the skewness (the degree of non-symmetry) Ssk of in a range of −0.50 to 1.1.

Comparative Examples B5-B7 and B9 did not satisfy the load area factor Smr1 at the boundary between a projected mountain portion and a core portion of in a range of 0% to 14.5%.

As such, Comparative Examples B1-B10 could not attain, at the same time, a reflection image diffusiveness index value R of in a range of 0.2 to 1 and a visibility index value T of in a range of 0.94 to 1.

Comparative Examples C1-C17 did not satisfy the following conditions:

Comparative Examples C9, C11, and C17 did not satisfy the projection density of in a range of $0.0001/\mu m^2$ to $0.05/\mu m^2$.

Comparative Examples C1-C6, C8, C10, and C12-C17 did not satisfy the arithmetic average surface roughness Sa of in a range of 0.06 μm to 0.143 μm.

Comparative Examples C9, C11, C16, and C17 did not satisfy the projection area ratio of in a range of 5.5% to 50%.

Comparative Examples C1-C3, C5-C7, C9, C10, and C12-C14 did not satisfy the skewness (the degree of non-symmetry) Ssk of in a range of −0.50 to 1.1.

As such, Comparative Examples C1-C17 could not attain, at the same time, a reflection image diffusiveness index value R of in a range of 0.2 to 1 and a visibility index value T of in a range of 0.94 to 1.

Comparative Examples D1-D7 did not satisfy the following conditions:

Comparative Examples D1-D3, D5, and D7 did not satisfy the arithmetic average surface roughness Sa of in a range of 0.06 µm to 0.143 µm.

Comparative Examples D6 did not satisfy the projection area ratio of in a range of 5.5% to 50%.

Comparative Examples D4, D6, and D7 did not satisfy the skewness (the degree of non-symmetry) Ssk of in a range of −0.50 to 1.1.

As such, Comparative Examples D1-D7 could not attain, at the same time, a reflection image diffusiveness index value R of in a range of 0.2 to 1 and a visibility index value T of in a range of 0.94 to 1.

Figure 7:
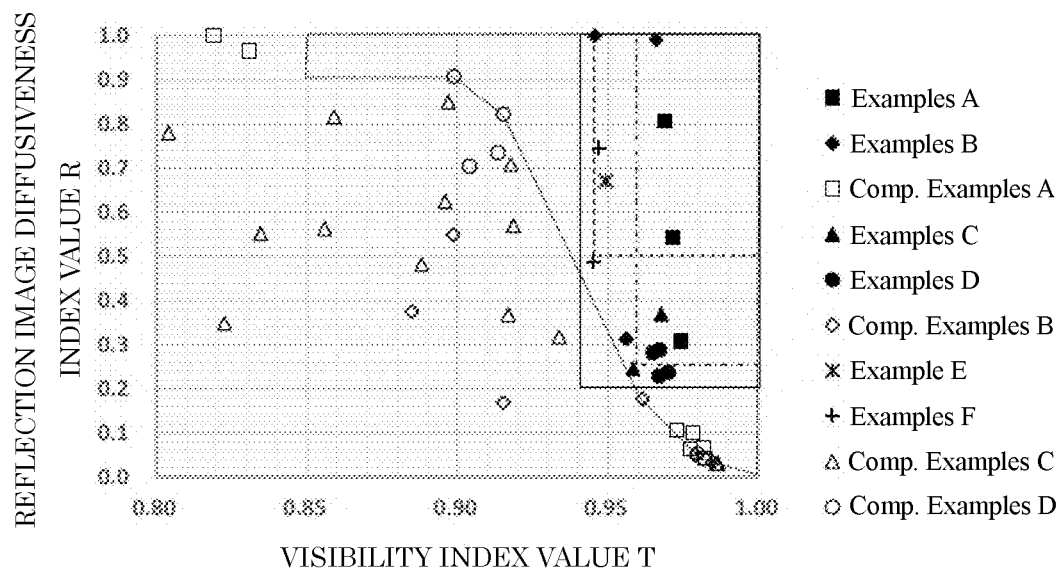
FIG. 7 is an enlarged view of a part of FIG. 6.

FIG. 6 is a graph showing a relationship between the visibility index value T and the reflection image diffusiveness index value R in Examples A1-A4 (written as Examples A in the figure), Examples B1-B3 (written as Examples B in the figure), Examples C1 and C2 (written as Examples C in the figure), Examples D1-D4 (written as Examples D in the figure), Example E1 (written as Example E in the figure), Examples F1 and F2 (written as Examples F in the figure), Comparative Examples A1-A22 (written as Comp. Examples A in the figure), Comparative Examples B1-B10 (written as Comp. Examples B in the figure), Comparative Examples C1-C17 (written as Comp. Examples C in the figure), and Comparative Examples D1-D7 (written as Comp. Examples D in the figure). FIG. 7 is an enlarged graph of a part of FIG. 6.

In FIG. 7, the range enclosed by a solid line is a range in which the reflection image diffusiveness index value R is from 0.2 to 1 and the visibility index value T is from 0.94 to 1. The range enclosed by a broken line is a range in which the reflection image diffusiveness index value R is from 0.5 to 1 and the visibility index value T is from 0.945 to 1. The range enclosed by a chain line is a range in which the reflection image diffusiveness index value R is from 0.25 to 1 and the visibility index value T is from 0.96 to 1. The range enclosed by a thin broken line is a range in which R and T are larger than in Comparative Examples.

It is seen from FIG. 7 that in Examples A, B, C, and D, both of the reflection image diffusiveness index value R and the visibility index value T are large, that is, the reflection image diffusiveness index value R is in a range of 0.2 to 1 and the visibility index value T is in a range of 0.94 to 1.

Figure 8:
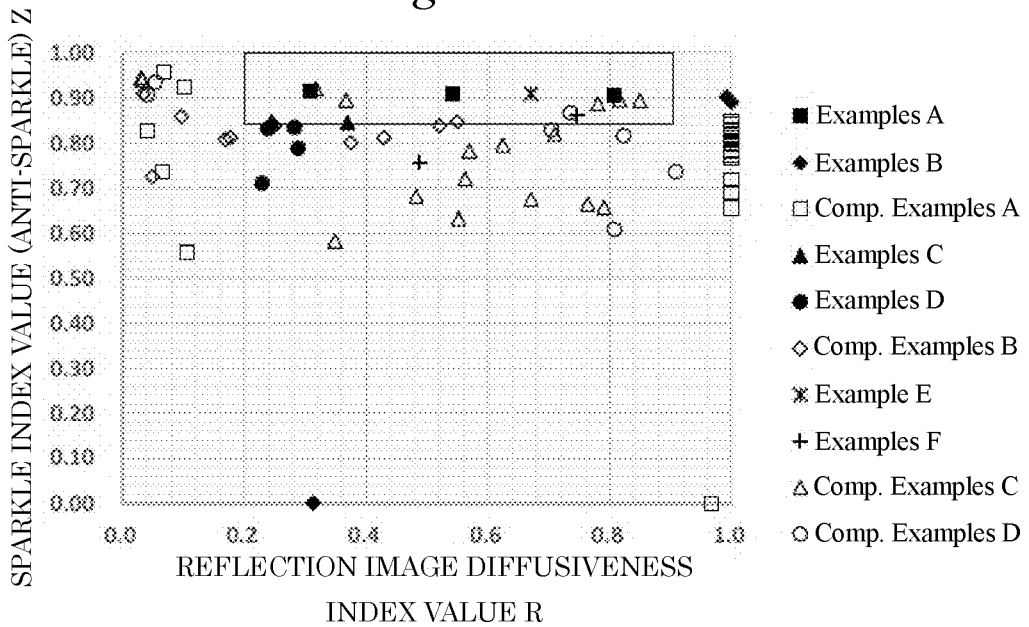
FIG. 8 is a graph showing a relationship between the reflection image diffusiveness index value R and sparkle index value (anti-sparkle) Z in Examples and Comparative Examples.
Figure 9:
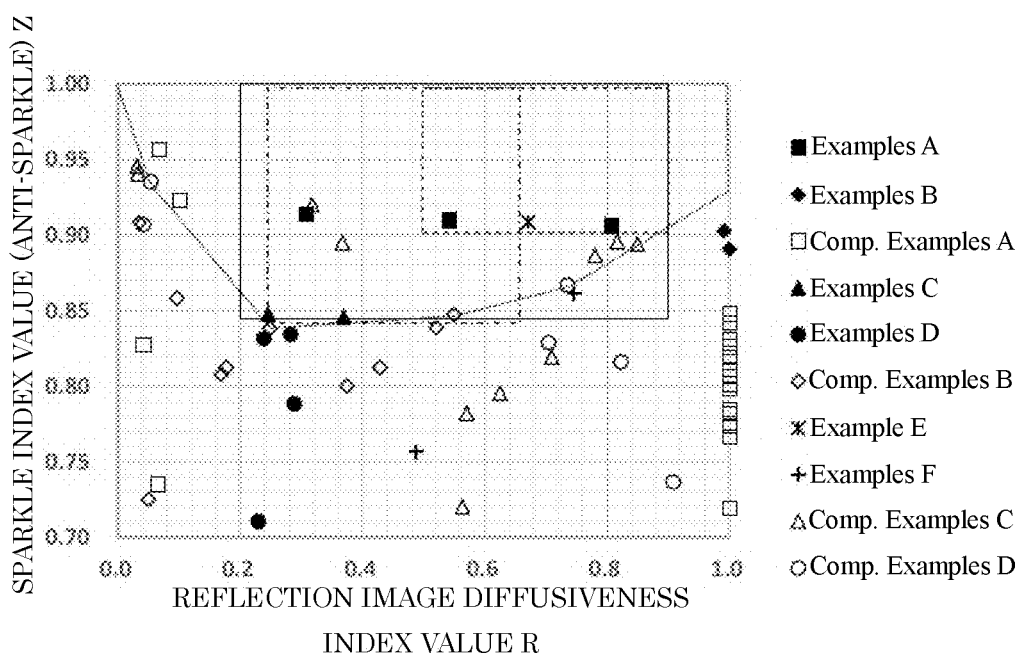
FIG. 9 is an enlarged view of a part of FIG. 8.

FIG. 8 is a graph showing a relationship between the reflection image diffusiveness index value R and the sparkle index value (anti-sparkle) Z in Examples A1-A4 (written as Examples A in the figure), Examples B1-B3 (written as Examples B in the figure), Examples C1 and C2 (written as Examples C in the figure), Examples D1-D4 (written as Examples D in the figure), Example E1 (written as Example E in the figure), Examples F1 and F2 (written as Examples F in the figure), Comparative Examples A1-A22 (written as Comp. Examples A in the figure), Comparative Examples B1-B10 (written as Comp. Examples B in the figure), Comparative Examples C1-C17 (written as Comp. Examples C in the figure), and Comparative Examples D1-D7 (written as Comp. Examples D in the figure). FIG. 9 is an enlarged graph of a part of FIG. 8.

In FIG. 9, the range enclosed by a solid line is a range in which the reflection image diffusiveness index value R is from 0.2 to 0.9 and the sparkle index value (anti-sparkle) Z is from 0.845 to 1. The range enclosed by a broken line is a range in which the reflection image diffusiveness index value R is from 0.5 to 0.9 and the sparkle index value (anti-sparkle) Z is from 0.905 to 1. The range enclosed by a chain line is a range in which the reflection image diffusiveness index value R is from 0.25 to 0.65 and the sparkle index value (anti-sparkle) Z is from 0.845 to 1. The range enclosed by a thin broken line is a range in which R and Z are larger than in Comparative Examples.

It is seen from FIG. 9 that in Examples A, C, and E, the reflection image diffusiveness index value R and the visibility index value T are large and, in addition, the sparkle index value (anti-sparkle) Z is large. That is, it is seen that the reflection image diffusiveness index value R is in a range of 0.2 to 0.9, the visibility index value T is in a range of 0.94 to 1, and the sparkle index value (anti-sparkle) Z is in a range of 0.845 to 1.

In general, the sparkle index value (anti-sparkle) Z decreases as the reflection image diffusiveness index value R increases. However, when the reflection image diffusiveness index value R is larger than or equal to 0.5, an opposite tendency appears that the sparkle index value (anti-sparkle) Z increases as the reflection image diffusiveness index value R increases. It is seen that the reflection image diffusiveness index value R and the sparkle index value (anti-sparkle) Z of Examples A, C, and E are larger than those of the lines connecting the points of Comparative Examples.

Figure 10:
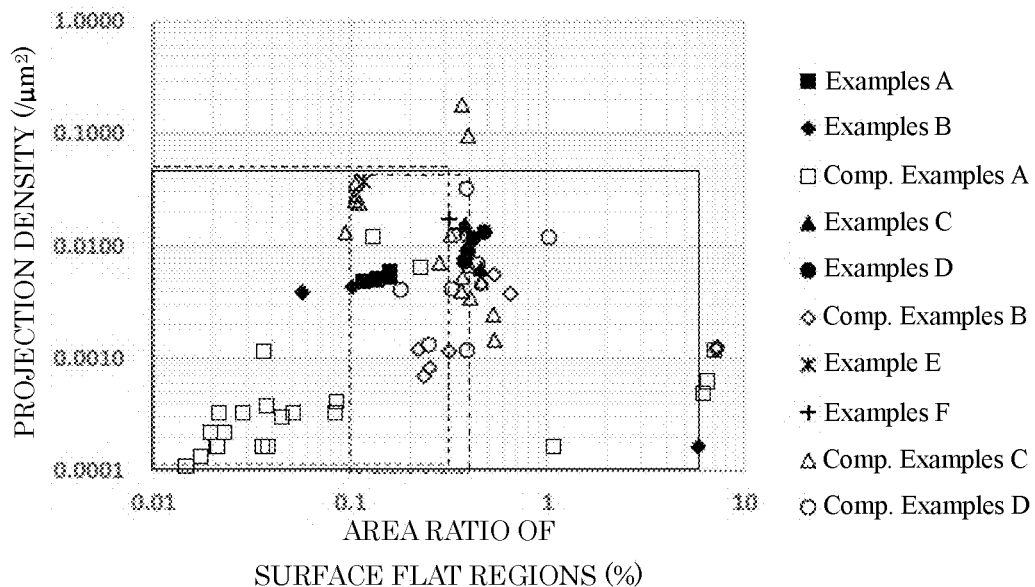
FIG. 10 is a graph showing a relationship between the area ratio of surface flat regions (0° to 0.5°) and the projection density in Examples and Comparative Examples.

FIG. 10 is a graph showing a relationship between the area ratio of surface flat regions (0° to 0.5°) and the projection density in Examples A1-A4 (written as Examples A in the figure), Examples B1-B3 (written as Examples B in the figure), Examples C1 and C2 (written as Examples C in the figure), Examples D1-D4 (written as Examples D in the figure), Example E1 (written as Example E in the figure), Examples F1 and F2 (written as Examples F in the figure), Comparative Examples A1-A22 (written as Comp. Examples A in the figure), Comparative Examples B1-B10 (written as Comp. Examples B in the figure), Comparative Examples C1-C17 (written as Comp. Examples C in the figure), and Comparative Examples D1-D7 (written as Comp. Examples D in the figure).

In FIG. 10, the range enclosed by a solid line is a range in which the area ratio of surface flat regions (0° to 0.5°) is from 0% to 5.8% and the projection density is from $0.0001/\mu m^2$ to $0.05/\mu m^2$. The range enclosed by a broken line is a range in which the area ratio of surface flat regions (0° to 0.5°) is from 0% to 0.32% and the projection density is from $0.0001/\mu m^2$ to $0.05/\mu m^2$. The range enclosed by a chain line is a range in which the area ratio of surface flat regions (0° to 0.5°) is from 0.1% to 0.4% and the projection density is from $0.0001/\mu m^2$ to $0.05/\mu m^2$.

It is seen from FIG. 10 that in Examples A, B, C, D, E, and F, the area ratio of surface flat regions (0° to 0.5°) is in a range of 0% to 5.8% and the projection density is in a range of $0.0001/\mu m^2$ to $0.05/\mu m^2$.

Figure 11:
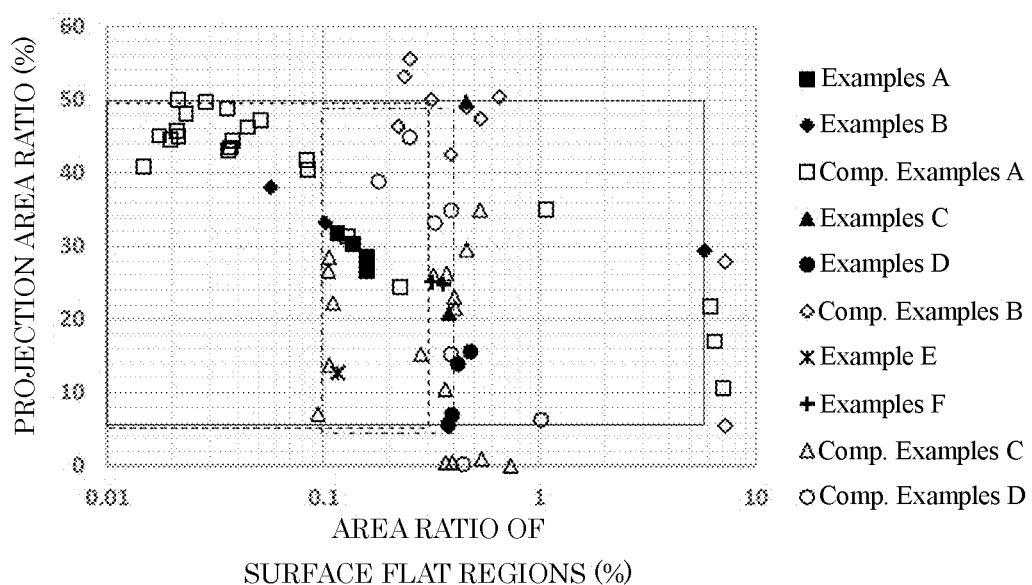
FIG. 11 is a graph showing a relationship between the area ratio of surface flat regions (0° to 0.5°) and the projection area ratio in Examples and Comparative Examples.

FIG. 11 is a graph showing a relationship between the area ratio of surface flat regions (0° to 0.5°) and the projection area ratio in Examples A1-A4 (written as Examples A in the figure), Examples B1-B3 (written as Examples B in the figure), Examples C1 and C2 (written as Examples C in the figure), Examples D1-D4 (written as Examples D in the figure), Example E1 (written as Example E in the figure), Examples F1 and F2 (written as Examples F in the figure), Comparative Examples A1-A22 (written as Comp. Examples A in the figure), Comparative Examples B1-B10 (written as Comp. Examples B in the figure), Comparative Examples C1-C17 (written as Comp. Examples C in the figure), and Comparative Examples D1-D7 (written as Comp. Examples D in the figure).

In FIG. 11, the range enclosed by a solid line is a range in which the area ratio of surface flat regions (0° to 0.5°) is from 0% to 5.8% and the projection area ratio is from 5.5% to 50%. The range enclosed by a broken line is a range in which the area ratio of surface flat regions (0° to 0.5°) is from 0% to 0.32% and the projection area ratio is from 5.5% to 50%. The range enclosed by a chain line is a range in which the area ratio of surface flat regions (0° to 0.5°) is from 0.1% to 0.4% and the projection area ratio is from 5.5% to 50%.

It is seen from FIG. 11 that in Examples A, B, C, D, E, and F, the area ratio of surface flat regions (0° to 0.5°) is in a range of 0% to 5.8% and the projection area ratio is in a range of 5.5% to 50%.

Figure 12:
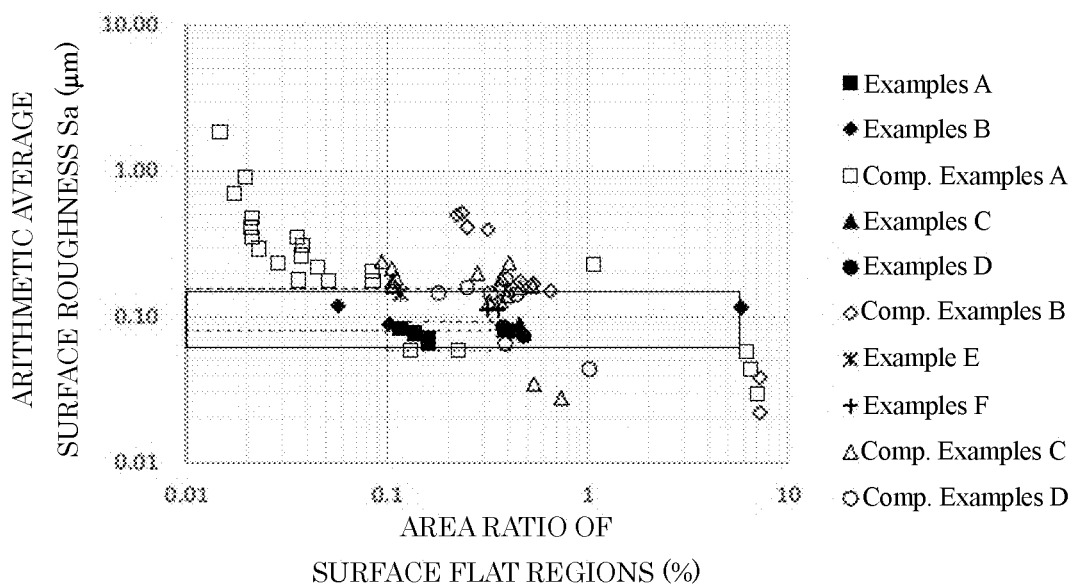
FIG. 12 is a graph showing a relationship between the area ratio of surface flat regions (0° to 0.5°) and the arithmetic average surface roughness Sa in Examples and Comparative Examples.

FIG. 12 is a graph showing relationships between the area ratio of surface flat regions (0° to 0.5°) and the arithmetic average surface roughness Sa in Examples A1-A4 (written as Examples A in the figure), Examples B1-B3 (written as Examples B in the figure), Examples C1 and C2 (written as Examples C in the figure), Examples D1-D4 (written as Examples D in the figure), Example E1 (written as Example E in the figure), Examples F1 and F2 (written as Examples F in the figure), Comparative Examples A1-A22 (written as Comp. Examples A in the figure), Comparative Examples B1-B10 (written as Comp. Examples B in the figure), Comparative Examples C1-C17 (written as Comp. Examples C in the figure), and Comparative Examples D1-D7 (written as Comp. Examples D in the figure).

In FIG. 12, the range enclosed by a solid line is a range in which the area ratio of surface flat regions (0° to 0.5°) is from 0% to 5.8% and the arithmetic average surface roughness Sa is from 0.06 µm to 0.143 µm. The range enclosed by a broken line is a range in which the area ratio of surface flat regions (0° to 0.5°) is from 0% to 0.32% and the arithmetic average surface roughness Sa is from 0.075 µm to 0.143 µm. The range enclosed by a chain line is a range in which the area ratio of surface flat regions (0° to 0.5°) is from 0.1% to 0.4% and the arithmetic average surface roughness Sa is from 0.05 µm to 0.1 µm.

It is seen from FIG. 12 that in Examples A, B, C, D, E, and F, the area ratio of surface flat regions (0° to 0.5°) is in a range of 0% to 5.8% and the arithmetic average surface roughness Sa is in a range of 0.06 µm to 0.143 µm.

Figure 13:
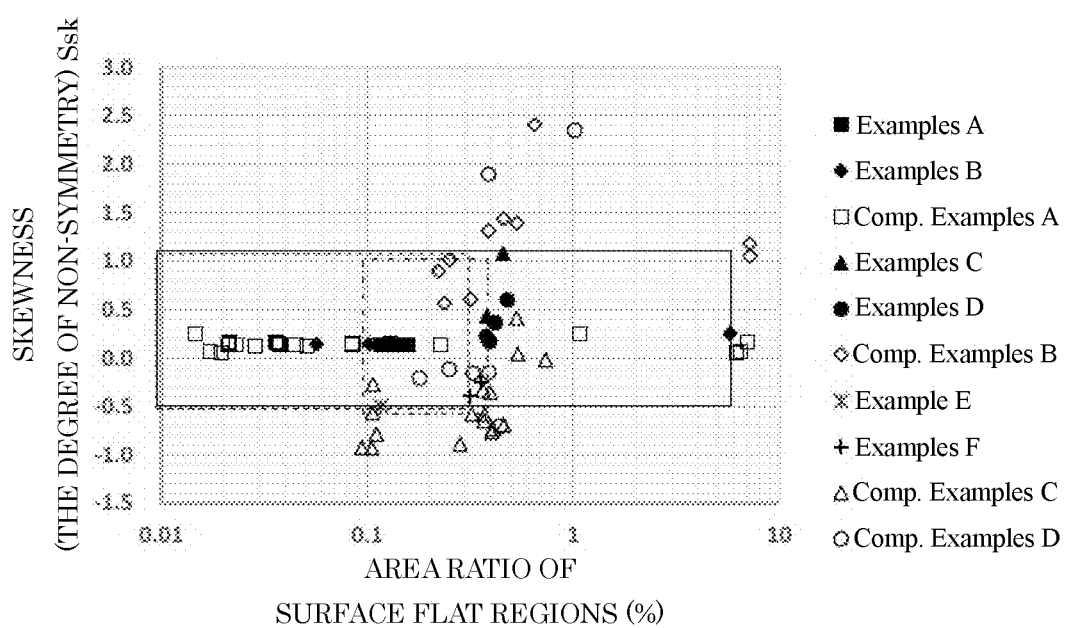
FIG. 13 is a graph showing a relationship between the area ratio of surface flat regions (0° to 0.5°) and the skewness (the degree of non-symmetry) Ssk in Examples and Comparative Examples.

FIG. 13 is a graph showing a relationship between the area ratio of surface flat regions (0° to 0.5°) and the skewness (the degree of non-symmetry) Ssk in Examples A1-A4 (written as Examples A in the figure), Examples B1-B3 (written as Examples B in the figure), Examples C1 and C2 (written as Examples C in the figure), Examples D1-D4 (written as Examples D in the figure), Example E1 (written as Example E in the figure), Examples F1 and F2 (written as Examples F in the figure), Comparative Examples A1-A22 (written as Comp. Examples A in the figure), Comparative Examples B1-B10 (written as Comp. Examples B in the figure), Comparative Examples C1-C17 (written as Comp. Examples C in the figure), and Comparative Examples D1-D7 (written as Comp. Examples D in the figure).

In FIG. 13, the range enclosed by a solid line is a range in which the area ratio of surface flat regions (0° to 0.5°) is from 0% to 5.8% and the skewness (the degree of non-symmetry) Ssk is from −0.5 to 1.1. The range enclosed by a broken line is a range in which the area ratio of surface flat regions (0° to 0.5°) is from 0% to 0.32% and the skewness (the degree of non-symmetry) Ssk is from −0.5 to 1.1. The range enclosed by a chain line is a range in which the area ratio of surface flat regions (0° to 0.5°) is from 0.1% to 0.4% and the skewness (the degree of non-symmetry) Ssk is from −0.5 to 1.1.

It is seen from FIG. 13 that in Examples A, B, C, D, E, and F, the area ratio of surface flat regions (0° to 0.5°) is in a range of 0% to 5.8% and the skewness (the degree of non-symmetry) Ssk is in a range of −0.5 to 1.1.

Figure 14:
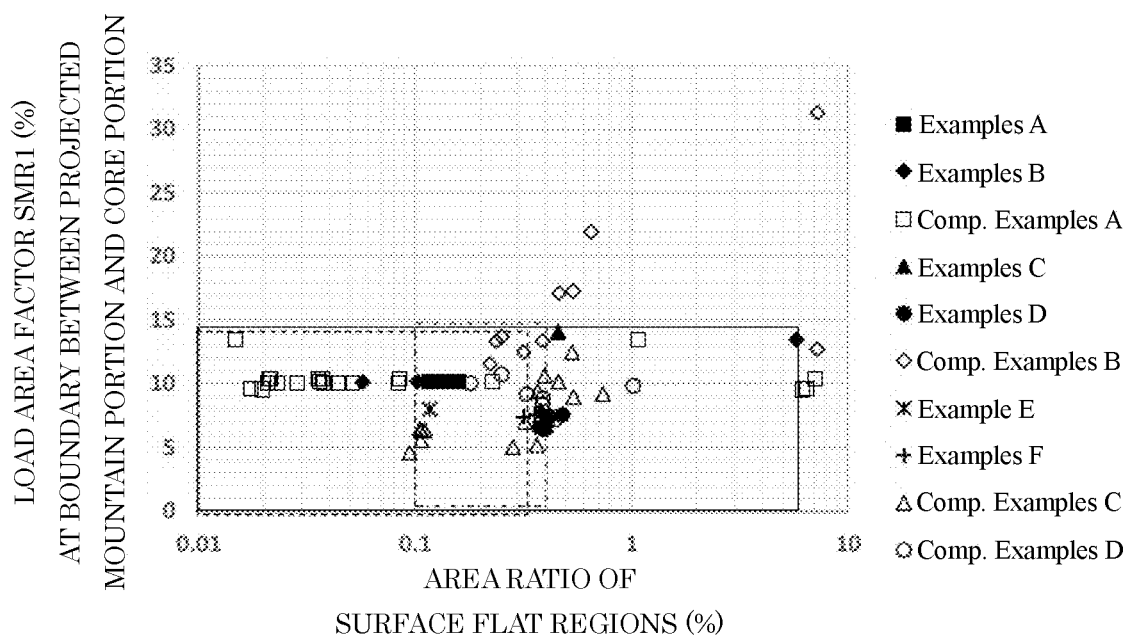
FIG. 14 is a graph showing a relationship between the area ratio of surface flat regions (0° to 0.5°) and the load area factor Smr1 at the boundary between a projected mountain portion and a core portion in Examples and Comparative Examples.

FIG. 14 is a graph showing a relationship between the area ratio of surface flat regions (0° to 0.5°) and the load area factor Smr1 at the boundary between a projected mountain portion and a core portion in Examples A1-A4 (written as Examples A in the figure), Examples B1-B3 (written as Examples B in the figure), Examples C1 and C2 (written as Examples C in the figure), Examples D1-D4 (written as Examples D in the figure), Example E1 (written as Example E in the figure), Examples F1 and F2 (written as Examples F in the figure), Comparative Examples A1-A22 (written as Comp. Examples A in the figure), Comparative Examples B1-B10 (written as Comp. Examples B in the figure), Comparative Examples C1-C17 (written as Comp. Examples C in the figure), and Comparative Examples D1-D7 (written as Comp. Examples D in the figure).

In FIG. 14, the range enclosed by a solid line is a range in which the area ratio of surface flat regions (0° to 0.5°) is from 0% to 5.8% and the load area factor Smr1 at the boundary between a projected mountain portion and a core portion is from 0% to 14.5%. The range enclosed by a broken line is a range in which the area ratio of surface flat regions (0° to 0.5°) is from 0% to 0.32% and the load area factor Smr1 at the boundary between a projected mountain portion and a core portion is from 0% to 14.5%. The range enclosed by a chain line is a range in which the area ratio of surface flat regions (0° to 0.5°) is from 0.1% to 0.4% and the load area factor Smr1 at the boundary between a projected mountain portion and a core portion is from 0% to 14.5%.

It is seen from FIG. 14 that in Examples A, B, C, D, E, and F, the area ratio of surface flat regions (0° to 0.5°) is in a range of 0% to 5.8% and the load area factor Smr1 at the boundary between a projected mountain portion and a core portion is in a range of 0% to 14.5%.

The present application is based on Japanese patent application No. 2018-030054 filed on Feb. 22, 2018, and the contents of which are incorporated herein by reference.

DESCRIPTION OF REFERENCE NUMERALS AND SIGNS

101: Measuring instrument
107: Linear light source device
111: Light source
112: Black flat plate
115: Surface brightness measuring device
120: Antiglare film-attached transparent substrate
122: Outer surface
131: First incident light
132: First reflection light
133: Second incident light
134: Second reflection light
201: Sparkle index value measuring instrument
202: Detector
203: Antiglare film-attached transparent substrate
204: First main surface
205: Second main surface
206: Display device

What is claimed is:

1. A translucent structure having a plurality of surface unevenness shapes, the translucent structure comprising:
an area ratio of surface flat regions in which an angle formed with a flat surface is in a range of 0° to 0.5° is in a range of 0% to 5.8%;

a projection density of in a range of $0.0001/\mu m^2$ to $0.05/\mu m^2$;

a projection area ratio of in a range of 5.5% to 50%;

a skewness Ssk which represents the degree of non-symmetry of in a range of −0.5 to 1.1;

wherein each of the surface unevenness shapes has a respective core portion, a respective projected mountain portion, and a respective load area factor Smr1 at a boundary between said respective core portion and respective projected mountain portion, and wherein the respective load area factor Smr1 for each of the surface unevenness shapes is in a range of 0% to 14.5%; and an arithmetic average surface roughness Sa of in a range of 0.06 μm to 0.143 μm.

2. The translucent structure according to claim 1, wherein the area ratio of surface flat regions in which the angle formed with the flat surface is in the range of 0° to 0.5° is in a range of 0.115% to 0.46%, the projection density is in a range of $0.0048/\mu m^2$ to $0.05/\mu m^2$, the projection area ratio is in a range of 12% to 50%, the respective load area factor Smr1 for each of the surface unevenness shapes is in a range of 7.9% to 14.5%.

3. The translucent structure according to claim 1, wherein the area ratio of surface flat regions in which the angle formed with the flat surface is in the range of 0° to 0.5° is in a range of 0% to 0.32%, and the arithmetic average surface roughness Sa is in a range of 0.075 μm to 0.143 μm.

4. The translucent structure according to claim 3, wherein the area ratio of surface flat regions in which the angle formed with the flat surface is in the range of 0° to 0.5° is in a range of 0.115% to 0.32%, the projection density is in a range of $0.0048/\mu m^2$ to $0.05/\mu m^2$, the projection area ratio is in a range of 12% to 50%, the respective load area factor Smr1 for each of the surface unevenness shapes is in a range of 7.9% to 14.5%, and the arithmetic average surface roughness Sa is in a range of 0.075 μm to 0.143 μm.

5. The translucent structure according to claim 1, wherein the area ratio of surface flat regions in which the angle formed with the flat surface is in the range of 0° to 0.5° is in a range of 0.1% to 0.4%, and the arithmetic average surface roughness Sa is in a range of 0.06 μm to 0.1 μm.

6. The translucent structure according to claim 5, wherein the area ratio of surface flat regions in which the angle formed with the flat surface is in the range of 0° to 0.5° is in a range of 0.115% to 0.4%, the projection density is in a range of $0.0048/\mu m^2$ to $0.05/\mu m^2$, the projection area ratio is in a range of 12% to 50%, the respective load area factor Smr1 for each of the surface unevenness shapes is in a range of 7.9% to 14.5%, and the arithmetic average surface roughness Sa is in a range of 0.06 μm to 0.1 μm.

7. The translucent structure according to claim 5, wherein the projection density is in a range of $0.0040/\mu m^2$ to $0.016/\mu m^2$, the projection area ratio is in a range of 20% to 34%, the skewness Ssk which represents the degree of non-symmetry is in a range of 0.14 to 0.45, the respective load area factor Smr1 for each of the surface unevenness shapes is in a range of 7.8% to 10.17%.

8. The translucent structure according to claim 1, wherein the translucent structure is a glass whose surface has been subjected to unevenness forming treatment or a glass having formed thereon a coating having unevenness shapes.

9. The translucent structure according to claim 1, which is a strengthened glass plate.

10. The translucent structure according to claim 1, wherein the translucent structure itself has three-dimensional shapes.

11. The translucent structure according to claim 1, having a print layer.

12. The translucent structure according to claim 1, having formed thereon a water-repelling/oil-repelling treated layer.

13. A display device comprising the translucent structure according to claim 1 as a cover member.

* * * * *